United States Patent
Danieli et al.

(10) Patent No.: US 6,905,414 B2
(45) Date of Patent: Jun. 14, 2005

(54) BANNING VERBAL COMMUNICATION TO AND FROM A SELECTED PARTY IN A GAME PLAYING SYSTEM

(75) Inventors: Damon V. Danieli, Clyde Hill, WA (US); Noah Heller, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 276 days.

(21) Appl. No.: 10/150,781

(22) Filed: May 17, 2002

(65) Prior Publication Data

US 2003/0216183 A1 Nov. 20, 2003

(51) Int. Cl.[7] ............................................. A63F 13/00
(52) U.S. Cl. ............................ 463/42; 463/2; 463/36
(58) Field of Search ................................. 463/36–43, 2

(56) References Cited

U.S. PATENT DOCUMENTS

| | | | | |
|---|---|---|---|---|
| 5,149,104 A | * | 9/1992 | Edelstein | 463/31 |
| 5,535,255 A | * | 7/1996 | Gabbay | 378/200 |
| 5,556,107 A | * | 9/1996 | Carter | 463/35 |
| RE36,574 E | * | 2/2000 | Hochstein et al. | 463/42 |
| 6,241,612 B1 | * | 6/2001 | Heredia | 463/42 |

* cited by examiner

*Primary Examiner*—John M. Hotaling, II
(74) *Attorney, Agent, or Firm*—Ronald M. Anderson

(57) ABSTRACT

Voice communication between players using one or more multiplayer game console is selectively controlled. A player may selectively block voice communications with another player during a current and any future games. In addition, an authorized party (e.g., a parent) can selectively preclude voice communication by a minor child by setting an option that is uploaded to an online game service service; the minor child is then precluded from voice communication on any voice console via the online game service. Also, a player may be temporarily or permanently banned from voice communication during games played through an online game service in response to complaints made by other players concerning the player's behavior in voice communication while playing games, e.g., excessive use of profanity. When a player signs on to the online game service, data are downloaded to the game console that indicate any applicable restraints on voice communication.

34 Claims, 13 Drawing Sheets

BANNING VERBAL COMMUNICATION TO AND FROM A SELECTED PARTY IN A GAME PLAYING SYSTEM

FIELD OF THE INVENTION

The present invention generally relates to control of verbal communication between players of an electronic game; and more specifically, pertains to selectively preventing verbal communication between players who are using one or more electronic game consoles to play a game.

BACKGROUND OF THE INVENTION

When playing a non-electronic game, for example, a card game such as bridge, with one or more other people, the social interaction and verbal sparring that arises during the game typically adds much to the enjoyment of the players. The verbal communication is also an element of game play, since comments made by a player to an opponent during a game can cause the opponent to lose concentration and perform poorly, while comments made to team members can provide encouragement, thereby promoting their quality of play. Communication between persons playing games is thus clearly an important element of the gaming experience.

The verbal repartee between players that is so important to game play was missing when players first began to play electronic games over the Internet and other network links. Players at different sites were generally not able to communicate with each other, because their personal computers (PCs) only communicated data related to the play of a game over the network. The loss of the verbal social interaction that is so much a part of game play when players are all in the same room caused play of games over the Internet to be less interesting. To address this problem, hardware and software solutions were developed that support voice communications between PCs over the network during game play. At about the same time, the techniques were developed to convey voice over the Internet or other networks (i.e., voice over IP) to enable communications between parties connected by the network without incurring the cost of conventional telephone long distance calls. This work resulted in the creation of various protocols supporting voice over IP communication, including the H.323 specification, Session Initiation Protocol (SIP), and Media Gateway Control Protocol/Media Gateway Controller (MGCP/MEGACO). Much of the functionality and techniques of voice over IP is applicable to and has been used in schemes to enable verbal communications over a network between players of PC electronic games. Examples of systems that provide voice communication between connected PCs during game play include Microsoft Corporation's SIDE WINDER GAME VOICE™, Mindmaker, Inc.'s GAME COMMANDER 2™ device and software, TEAM-SOUND™ software, GameSpy Industries' ROGER WILCO software, and Alienware Technology's FIRST CONACT software. The voice communication provided by these products greatly adds to the enjoyment of playing games on PCs that are connected over the Internet or other networks. Some of these systems operate in peer-to-peer mode, in which voice data are transferred over the network directly between PCs, while others require a voice server that receives the voice data from one game player computer and forwards the data over the network to one or more other computers connected to the network for playing the game.

In contrast to a PC game system in which only one player is supported on each PC, a multiplayer game console supports a plurality of players on each console. Voice communication systems have been developed for game consoles that enable verbal communications between a plurality of players who are playing a game. The verbal communication can be between players on the same game console or between players on different game consoles that are coupled in communication, either directly or over a network, such as the Internet.

While verbal communication during game play is generally a desirable feature, if abused or misused by a specific player, it may become bothersome to one or more other players in a game. The cause of the annoyance to a player may be the repeated use of profanity or sexually explicit language by the specific player, or may simply be language or comments that a player feels to be socially unacceptable. Since each player has an individual reaction to certain verbal behavior, the causes for a player to be annoyed by the verbal communication with a specific player are virtually unlimited. Nevertheless, it will be important to enable any player who becomes annoyed with the verbal communication of a specific player to prevent further verbal communications with that specific other player. The prior art does not enable a player to block verbal communication with an annoying player in a specific game played on a multiplayer game console, or to generally block an annoying player from talking or listening to the player during any game played on multiplayer game consoles.

Control of verbal communication with selected other players might be implemented by game software, to permit the control to extend only over a single game play session. Alternatively, the control of verbal communication might better be applied based upon player data maintained at a central site, such as an online game service service. Each time that a player logs on through a game console to play a game over the network, the data can then be accessed to determine if verbal communication by one of the players or between certain players has been precluded. The act by a player of muting verbal communications with a selected player during a game should preferably not alert the selected player of that decision, and should not adversely impact on the player's ability to communicate with other players in a game. The muting of a selected player by another player should remain in effect, regardless of changes in an alias or changes in the gaming device used by the selected player to play games over a network.

Parents may want to block their child from participating in voice communication during game play to avoid exposure to even mild profanity or verbal communication with someone who might attempt to contact the child outside the scope of game play, for harmful purposes. The parental blocking of verbal communications of a child should be stored on the online game service and should still be in effect if the childe connects from a different game console. The prior art game voice communication systems do not permit blocking verbal communications by a selected player, such as a child, participating in games using a multiplayer game console.

Another area of control of verbal communications relates to the concept of policing the behavior of players. Ideally, the reactions of other players exposed to a specific player's behavior during verbal communications while playing games on a network should be the basis for any prohibition placed on further verbal communication by that player. Should any player's verbal conduct be viewed as so egregious (based upon the number of complaints received from other players, or some other criteria) as to warrant it, an automated function on the online game service or the online game service operator should be able to prevent that player from participating in verbal communication while playing games. The ban on verbal communication by such a player might only be for a limited period of time, e.g., for a period of a week, but, if justified by continued unacceptable verbal behavior, the ban on verbal communication by the player might be made permanent. Again, the current voice communication systems do not enable this level of control to be applied to verbal communication by selected players on a multiplayer game console who are connecting to other game consoles through an online game service service.

SUMMARY OF THE INVENTION

As noted above, voice communication between one person playing a game on a PC connected over a network to one or more other players who are each using their own PC to play the game is well known. However, the present invention pertains to multiplayer game consoles that enable verbal communication between players who are playing the game on one or more game consoles. Specifically, the present invention enables verbal communication by a specific player to be controlled during one or more games played on multiplayer game consoles. To accomplish this function, data are maintained for each player participating in the game. The data include an indicator referencing a specific player who has been precluded from verbally communicating during game play. The blocking of a player from verbally communicating applies during a current game session or during all games played with another player who has chosen not to verbally communicate with the specific player, or during all games played by the specific player using an online game service service, or during all games played by the specific player using a specific multiplayer game console. In response to the indicator in the data and in accord with one of these criteria, verbal communication with the specific player is thus prevented.

If the data include an association between the other player who has chosen not to verbally communicate with the specific player and the indicator referencing the specific player, the specific player will be prevented from verbally communicating with the other player in any game in which both the other player and the specific player are participating. To achieve this capability, the data are maintained for each player in games being played over the network and are accessed by the multiplayer game console.

It is also contemplated that the data can be created and maintained locally by a game being played on the multiplayer game console. In this case, the data will include an association between the other player who has chosen not to verbally communicate and the indicator referencing the specific player, so that the specific player will be prevented from verbally communicating with the other player during a game in which both the other player and the specific player are participants.

Another type of verbal communication control is provided by enabling a parent or other authorized party to select an option on the game console that determines whether a minor child is able to participate in verbal communication while playing games. In this case, the indicator included in the data references the minor child as the specific player and indicate that the parent or authorized party has chosen to block verbal communication in games played by the minor child.

In most cases, the data that include the indicator are accessed at the online game service used for playing games over the network. Indeed, the indicator indicating that a specific player is precluded from verbally communicating can also be automatically created as a function of a number of complaints made by other players about the verbal communication behavior of the specific player. For example, if a specific player uses excessive profanity in verbal communications during game play so that a sufficient number of other players complain, the specific player can be automatically prevented from using voice communication for a defined time interval, and, if the problem continues, the prohibition can be made permanent. The player who has been prevented from verbally communicating cannot avoid the problem simply by changing to a different alias or by using a different multiplayer game console. The indicator in the data refers to the specific player independently of any alias used by the specific player and without regard to the game console used by the specific player to play a game over the network.

A player who has been precluded from verbally communicating with another player will not receive any indication that such a decision has been made. Thus, it is not evident that a player has chosen not to communicate with another player. If a specific player has been generally precluded from verbally communicating in all games, the display will indicate to all other players in a game in which the specific player is participating, that the specific player has been muted.

Verbal communication between players is preferably prioritized based upon user-define priorities. For example, a user may specify that verbal communication with another player will always have priority, or game-specific roles assumed by players may be the basis for setting the priority of a verbal communication relative to other verbal communications. Thus, a verbal communication from a team leader may be set to have priority over verbal communications from other members of the team. The game may define the priorities, or the player may determine them.

Another aspect of the present invention is directed to a memory medium having a plurality of machine executable instructions for carrying out the steps of the method discussed above. Still another aspect of the invention is directed to a system for preventing verbal communication by a specific player during play of an electronic game. The system includes a multiplayer game console having a processor, a network interface adapted for communicating over a network with at least one other multiplayer game console, verbal communication input and output devices for each player who will be verbally communicating during the game, and a memory in which are stored machine instructions for causing the processor to carry out a plurality of functions. These functions are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Gaming System for Practicing the Present Invention

Figure 1:
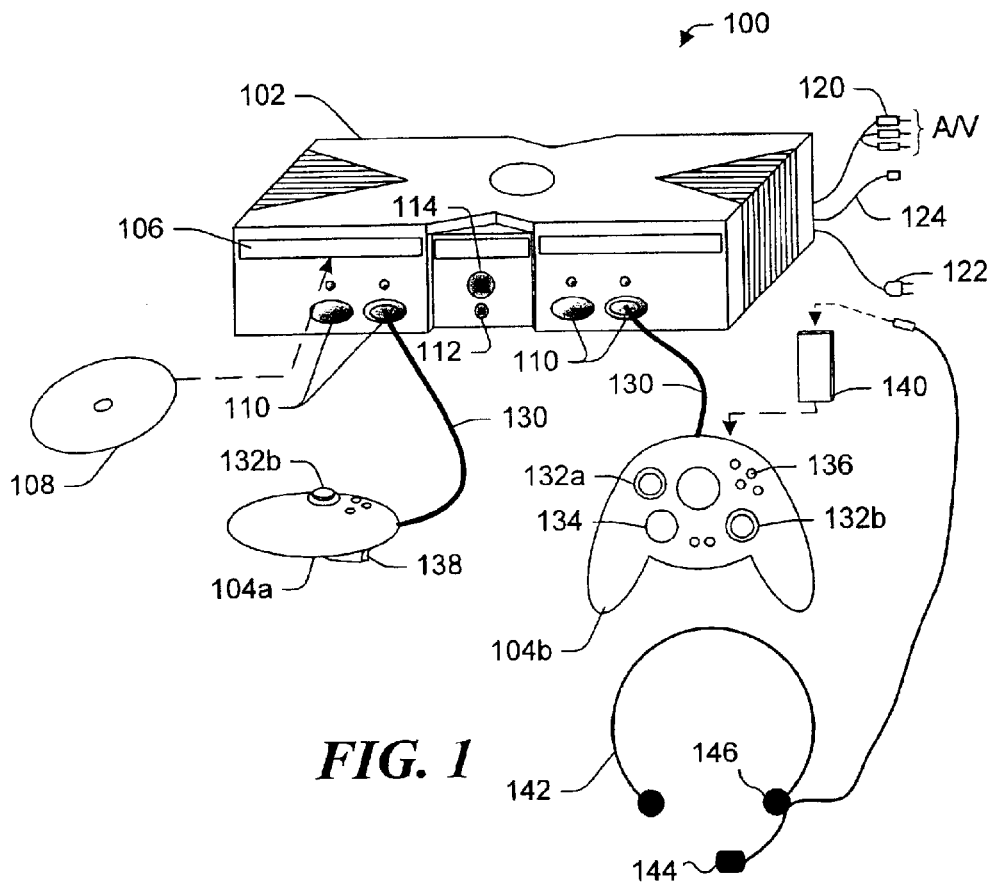
FIG. 1 is a schematic isometric view of a multiplayer game console and voice communication system in accord with the present invention.

As shown in FIG. 1, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and compact disk-read only memory (CD-ROM) discs. In this gaming system, game programs are preferably distributed for use with the game console on DVD discs, but it is also contemplated that other storage media might instead be used, or that games and other programs can be downloaded over the Internet or other network.

On a front face of game console 102 are four connectors 110 that are provided for electrically connecting to the controllers. It is contemplated that other types of connectors or wireless connections might alternatively be employed. A power button 112 and a disc tray eject button 114 are also positioned on the front face of game console 102. Power button 112 controls application of electrical power to the game console, and eject button 114 alternately opens and closes a tray (not shown) of portable media drive 106 to enable insertion and extraction of storage disc 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown).

Game console 102 may be further provided with a data connector 124 to transfer data through an Ethernet connection to a network and/or the Internet, or through a broadband connection. Alternatively, it is contemplated that a modem (not shown) may be employed to transfer data to a network and/or the Internet. As yet a further alternative, the game console can be directly linked to another game console via an Ethernet cross-over cable (not shown).

Each controller 104a and 104b is coupled to game console 102 via a lead (or in another contemplated embodiment, alternatively, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 1, each controller 104a and 104b is equipped with two thumb sticks 132a and 132b, a D-pad 134, buttons 136, and two triggers 138. These controllers are merely representative, and other gaming input and control mechanisms may be substituted for or used in addition to those shown in FIG. 1, for controlling game console 102.

Removable function units or modules can optionally be inserted into controllers 104 to provide additional functionality. For example, a portable memory unit (not shown) enables users to store game parameters and port them for play on another game console by inserting the portable memory unit into a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and an headphone 146 or other type of audio transducer for producing audible sound in response to an output signal from the game console. In another embodiment that is being contemplated (not shown), the voice communicator capability is included as an integral part of a controller (not shown) that is generally like controllers 104a and 104b in other respects. The controllers illustrated in FIG. 1 are configured to accommodate two removable function units or modules, although more or fewer than two modules may instead be employed.

Gaming system 100 is of course capable of playing games, but can also play music, and videos on CDs and DVDs. It is contemplated that other functions can be implemented by the game controller using digital data stored on the hard disk drive or read from optical storage disc 108 in drive 106, or from an online source, or from a function unit or module.

Functional Components for Practicing the Present Invention

Figure 2:
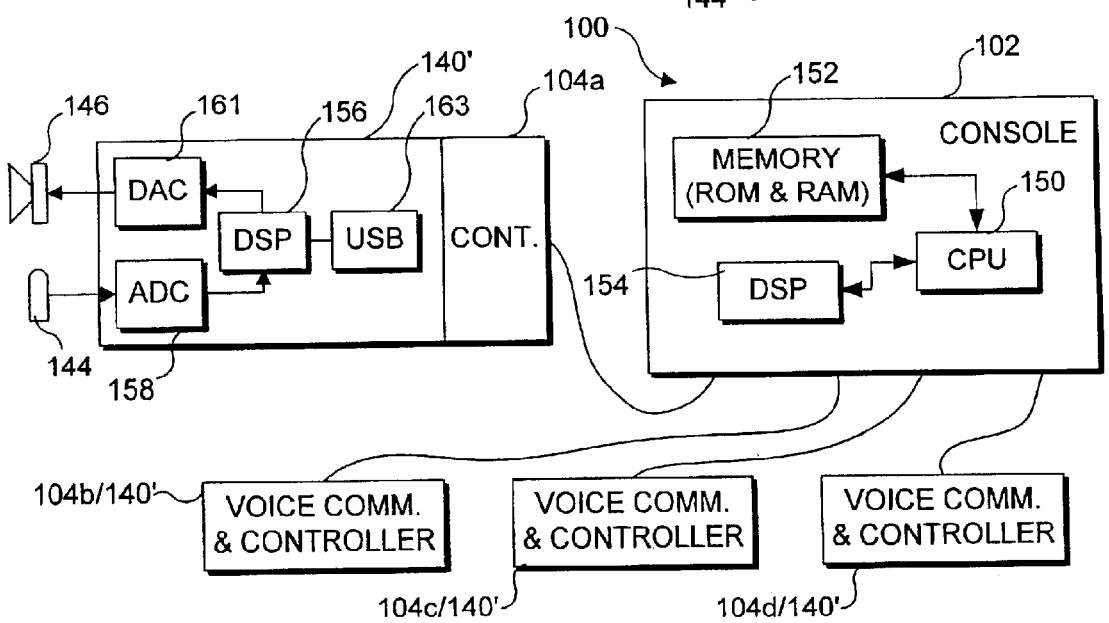
FIG. 2 is a block diagram of the multiplayer game console and voice communication module of FIG. 1.

Turning now to FIG. 2, a functional block diagram illustrates, in an exemplary manner, how components are provided to facilitate voice or verbal communication between players during the play of electronic games on the multiplayer game console. As noted above, this embodiment of game console 100 can have up to four players on each console, and each player can be provided with a controller and voice communicator. Details of a voice communicator module 140' are illustrated in connection with its associated controller 104a. It will be understood that controllers 104b, 104c, and 104d (if coupled to game console 100) can optionally each include a corresponding voice communication module 140' like that coupled to controller 104a. In a current preferred embodiment, voice communication module 140' includes a digital signal processor (DSP) 156, an analog-to-digital converter (ADC) 158, a digital-to-analog converter (DAC) 161, and a universal serial bus (USB) interface 163. In response to sound in the environment that is incident upon it, microphone 144 produces an analog output signal that is input to ADC 158, which converts the analog signal into a corresponding digital signal. The digital signal from ADC 158 is input to DSP 156 for further processing, and the output of the DSP is applied to USB interface 163 for connection into controller 104*a*. In this embodiment, voice communication module 140' connects into the functional unit or module port on controller 104*a* through a USB connection (not separately shown). Similarly, digital sound data coming from game console 100 are conveyed through controller 104*a* and applied to USB interface 163, which conveys the digital signal to DSP 156 and onto DAC 161. DAC 161 converts the digital signal into a corresponding analog signal that is used to drive headphone 146.

With reference to multiplayer game console 100, several key functional components are shown, although it should be understood that other functional components relevant to the present invention are also included, but not shown. Specifically, game console 100 includes a central processing unit (CPU) 150, a memory 152 that includes both read only memory (ROM) and random access memory (RAM). Also provided is a DSP 154. The digital signal produced by ADC 158 in response to the analog signal from microphone 144 is conveyed through controller 104*a* to CPU 150, which handles encoding of the voice stream signal for transmission to other local voice communication modules and to other game consoles over a broadband connection through an Ethernet port (not shown in FIG. 2) on the game console.

An alternative embodiment employs DSP 156 in voice communication module 140' to encode the digital signal produced by ADC 158 in response to the analog signal from microphone 144. The encoded data are then conveyed through controller 104*a* to CPU 150, which again handles transmission of the encoded data to other local voice communication modules and other game consoles over the broadband connection on the game console.

It should be noted that multiplayer game console 100 can be either directly connected to another game console using a crossover Ethernet cable as a link, or can be connected to one or more other multiplayer game consoles through a more conventional network using a hub, switch, or other similar device, and/or can be connected to the Internet or other network through an appropriate cable modem, digital subscriber line (DSL) connection, or other appropriate interface broadband connection. An alternative embodiment is also contemplated in which multiplayer game console 100 is connected to the Internet or other network through a modem (not shown). Digital signals conveyed as packets over a direct or network connection are input to CPU 150 through the Ethernet port on game console 100 (or from other voice communication modules and controllers connected to the same game console), and are processed by the CPU to decode data packets to recover digital sound data that is applied to DSP 154 for output mixing. The signal from DSP 154 is conveyed to the intended voice communication module for the player who is the recipient of the voice communication for input through USB interface 163.

An alternative embodiment employs the CPU to convey the encoded data packets to intended voice communication module 140' through controller 104*a*. The encoded data packets are then decoded by DSP 156 in voice communication module 140', and the resulting decoded signal is conveyed to DAC 161, which creates a corresponding analog signal to drive headphone 146.

In still another contemplated alternative, the headphone and microphone for each player can be coupled directly to the game console and the functions of the voice communication module can be carried out by the CPU or other processor such as a DSP, and appropriate DAC and ADC modules in the game console. The location of the components that process sound signals to produce sound data conveyed between players and to produce the analog signals that drive the headphone of each player is thus not critical to the present invention.

CPU 150 also applies voice effects to alter the characteristics of the sound of a player speaking into microphone 144 and is able to change the character of the sound with a selection of different effects. For example, a female player can choose a voice effect to cause her voice to sound like the deep-tone voice of a male, or so that the voice has an elfin quality, or so that it has one of several other desired different tonal and pitch characteristics. Available voice effects from which a player can choose are game dependent. Such voice effects can substantially alter the sound of the player's voice so that the player is virtually unrecognizable, and can add drama or greater realism to a character in a game being controlled by a player, when the character appears to speak to other characters in the game. The voice effects thus facilitate role playing and mask the player's true identity. Even when players connected to the same game console 100 are directly audible to each other because they are only a few feet apart in the room in which the game console is disposed, the change in a player's voice due to voice effects being applied so alters the sound heard by other players receiving the verbal communication through their headphones that the local sound of a player's voice propagating within the room to the players can easily be ignored.

While not actually a limitation in the present invention, a current preferred embodiment of the game console 100 is designed with the expectation that a maximum of up to 16 players can engage in verbal communication during a game being played over a network or over the Internet through an online game service. Clearly, there is a practical limit to the number of verbal communications from other players with which a player might expect to engage at one time. Accordingly, it was assumed that a player is unable to comprehend verbal communications from more than four other players speaking simultaneously.

Game Play Scenarios

There are different appropriate scenarios, depending upon the type of game and the number of players engaged in a given game that affect the requirements for encoding and decoding voice communication signals. For example, there are three primary scenarios that impact on the requirements for voice communication. The first scenario is referred to as "point-to-point" and includes one player on each of two interconnected game consoles, where each player is engaged in voice communication with the other player. In the second scenario, which is referred to as "multipoint," there is again only one player who is engaged in voice communication on each game console, but up to 16 game consoles are interconnected over a network for play of a game, in which up to 16 players are participating. The third scenario is referred to as "multiplayer on game console," since up to four players per game console and up to four game consoles can be interconnected over a network to enable up to 16 players to simultaneously play a game and verbally communicate. In regard to the last scenario, two or more players on a single game console can also use voice communication during a game although they are physically located within the same room, since the benefits of the voice changes produced by use of the voice effects option can enhance the enjoyment of the game and role playing by each player, as noted above. Further, the limits of the total number of game consoles/player referenced above in each of the three scenarios can be thought of as soft limits, since there is no inherent hardware limitation precluding additional players or game consoles participating.

By designing games in accord with one or more of these three scenarios, it is possible for the software designer to set a maximum predefined limit on the computing resources that will be allocated to voice communication, to avoid voice communication from adversely impacting the quality of game play. Also, a specific game that is played on the multiplayer game console can have its own requirements so that it is appropriate for play by only a certain number of players. The nature of the game will then dictate limitations on the number of verbal communication channels required. For example, a game such as chess will normally be played using the point-to-point scenario, because chess typically involves only two players. The voice communication functionality enables the two players to talk to each other while playing a chess game. For this point-to-point scenario, each game console would need to instantiate only one encoder and one decoder, since more encoders and decoders are not required. During each voice frame update, the CPU on a game console will update any encoding and decoding as necessary. Using a predefined encode CPU usage limit of 1.5 percent and a decode CPU usage limit of 0.5 percent in the point-to-point scenario, the total requirement for CPU usage would be only about 2.0 percent.

Figure 4:
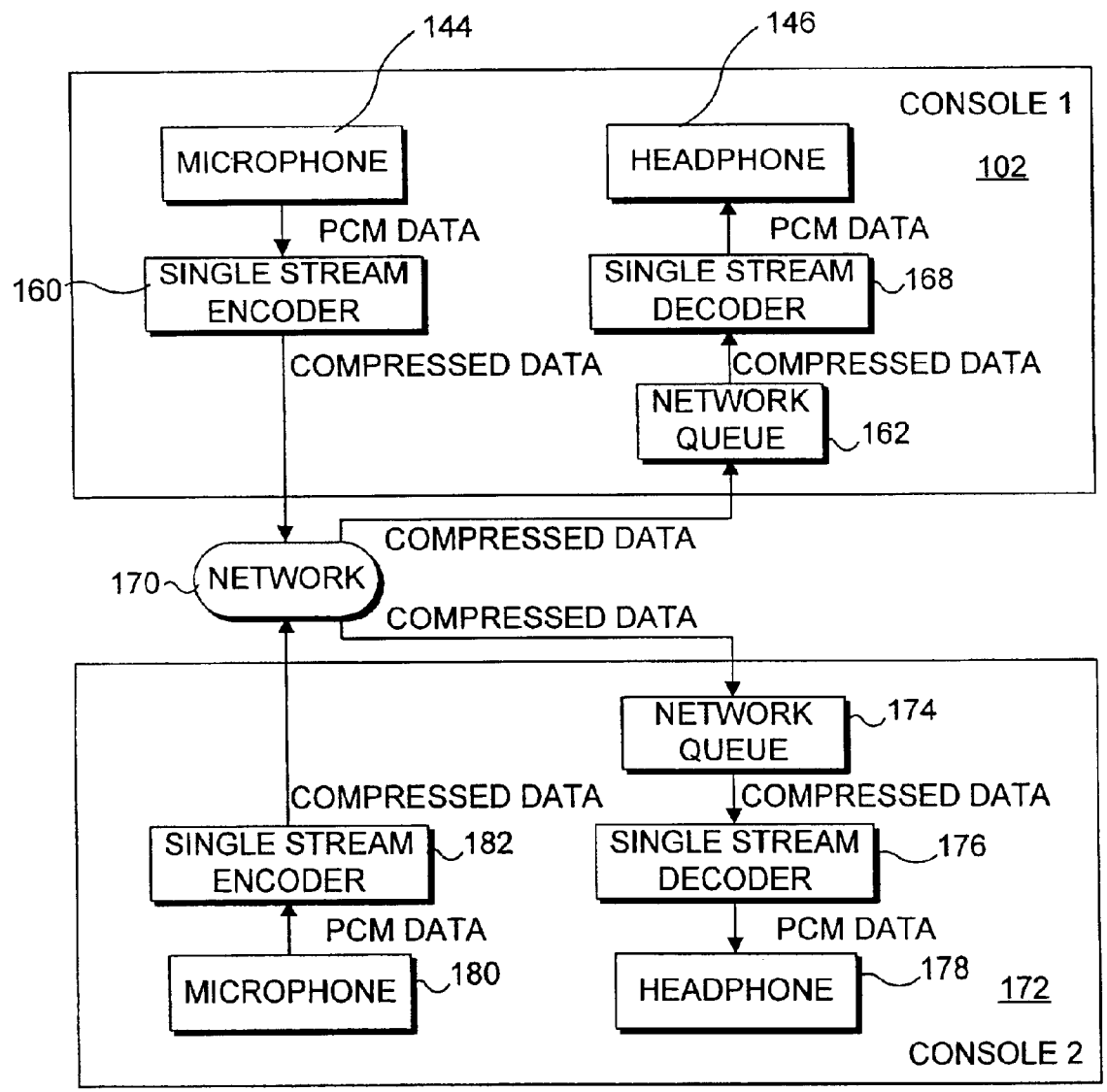
FIG. 4 is a functional block diagram illustrating two multiplayer game consoles coupled in point-to-point communication over a network.

As shown in the functional block diagram of FIG. 4, a game console 102 is coupled in voice communication with a game console 172. Microphone 144 responds to the voice of the player using console 102, and the voice communication module connected to the microphone produces pulse code modulated (PCM) data that are input to a single stream encoder 160. In response to the PCM data, the encoder produces compressed data packets that are then transmitted over a network 170 to which game console 172 is connected.

Alternatively, signal stream encoding can be carried out by the DSP of voice communication module. In this embodiment, microphone 144 responds to the voice of the player using game console 102, and DSP 156 is connected to ADC 158 and produces the compressed data packets that are then sent to game console 102 for transmission over network 170 to game console 172.

The compressed data from game console 102 are input to a network queue 174 in game console 172. The purpose of using a network queue to receive sound packet compressed data from console 102 is to remove jitter and other timing anomalies that occur when data are sent over network 170. The output of the single stream decoder is PCM data which are then applied to the DAC in the voice communication module of the player using game console 172 to produce an analog output that drives a headphone 178.

In an alternative embodiment, the compressed data are conveyed from game console 102 to DSP 156 in the voice communication module. The DSP decodes the compressed data, converting to a corresponding PCM signal, which is applied to DAC 161 in the voice communication module of the player using game console 172, to produce a corresponding analog output signal used to drive headphone 178.

Similarly, for verbal communications from the player using console 172, a microphone 180 converts the sound incident on it into PCM data using the ADC within the communication module to which microphone 180 is connected, and the PCM data are input to a single stream encoder 182, which produces compressed data that are conveyed through network 170 to a network queue 162 within game console 102. The compressed data from network queue 162 are input to a single stream decoder 168, which produces PCM data that are input to DAC converter in the voice communication module to which headphone 146 is connected. The DAC produces a corresponding analog sound signal. Thus, headphone 146 receives the analog sound signal corresponding to the sound of the player connected to console 172 (with any voice effects added).

In the multipoint scenario, where there is one player on each console, but multiple game consoles participating in a game session, the game designer can determine if all players should be able to verbally communicate with all of the other players playing the game, or if there will be teams comprising subsets of the players, so that only the players in on the same team may talk to each other. For example, if the game being played in multipoint scenario is a card game, there might be four individual players, one each per game console, or there might be two teams of two players each. If there are four separate players, each game console would instantiate one encoder and one four-to-one decoder (as discussed below). During a voice frame update, each console would update any encoding necessary for transmitting speech by the single player using the game console, and decoding of speech data from any of the (up to) three other players on the other game consoles participating in the game. For this scenario, using a predefined encode limit for CPU usage of 1.5 percent and a four-to-one decoder limit for CPU usage of about 1.3 percent, the total would be about 2.8 percent CPU usage on any of the four game consoles being used to play the card game.

Figure 3:
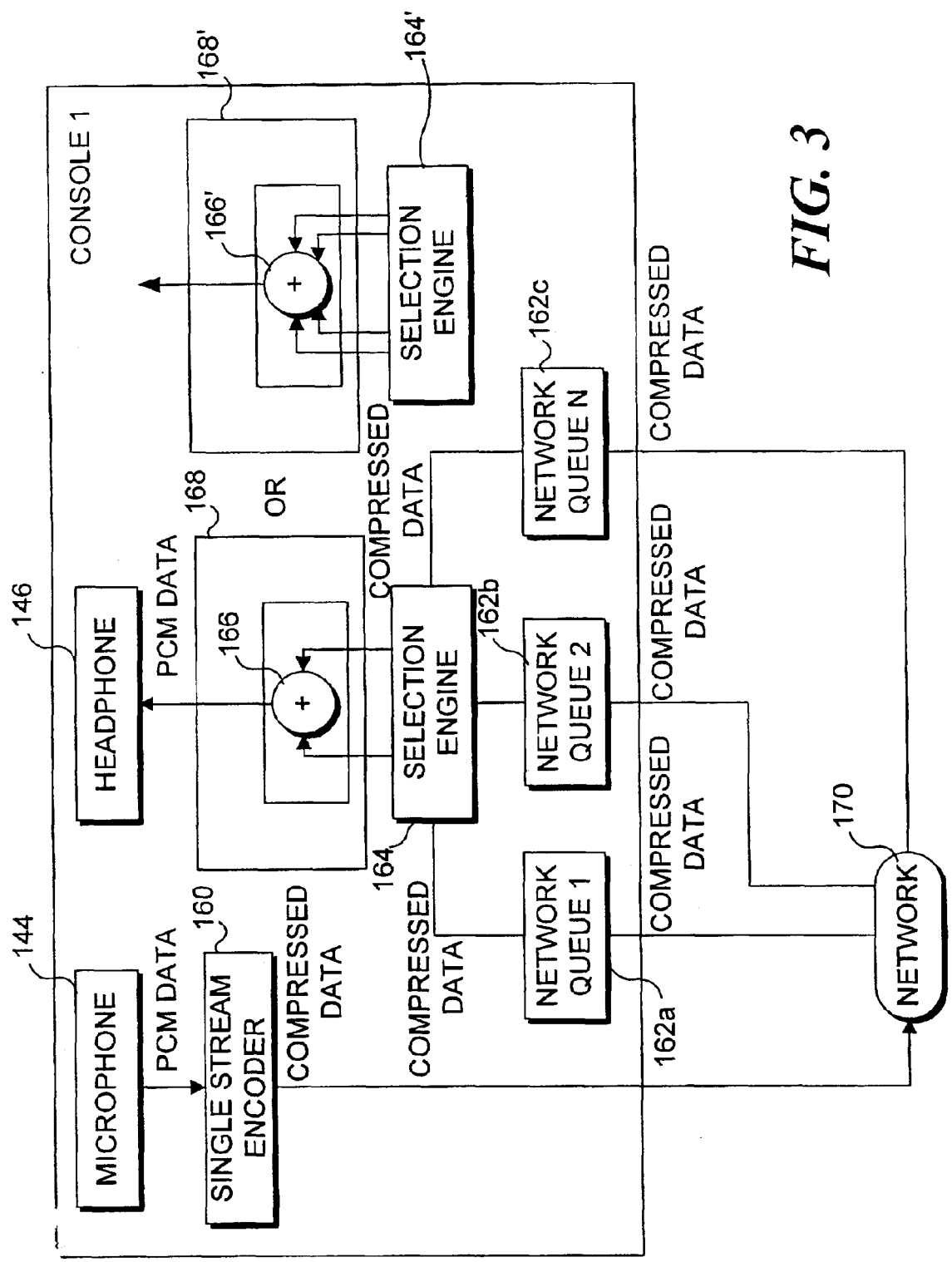
FIG. 3 is a functional block diagram of a multiplayer game console with voice communication capability.

FIG. 3 illustrates how the multipoint scenario is functionally implemented on each game console, but does not show the other game consoles. However, it will be understood that network 170 couples the other game consoles in communication with the illustrated game console. As noted above, the game console includes a single stream encoder 160, which receives the PCM data produced by the ADC in the voice communication module (not shown in FIG. 3) of the player. The PCM data are input into single stream encoder 160, producing voice frames of compressed data in packet form for transmission over network 170 to the other game consoles. Similarly, packets of compressed data are conveyed through network 170 from the other game consoles to the illustrated game console. Each player participating in the game (or channel) has a network queue on the game console in which the data packets are temporarily stored, to ensure that jitter and other timing problems are minimized when the packets of compressed data are selected by a selection engine 164 for mixing by a mixer 166 and decoding by decoder 168. Decoder 168 produces PCM data that are supplied to the DAC, which produces the analog signal that drives headphone 146.

In an alternative embodiment, selection engine 164 conveys the two selected compressed data streams to DSP 156 of the voice communication module (shown in FIG. 2) for mixing and decompression. DSP 156 produces a corresponding PCM signal that is supplied to the DAC in the voice communication module, which in turn, produces the corresponding analog signal that drives headphone 146.

As indicated in FIG. 3, network queues 162a, 162b, and 162c are respectively provided for each of the other players—up through N players.

In the multipoint scenario discussed above, there are only three network queues, since there are only three other players engaged in the card game. Since mixer 166 only combines two inputs at a time, decoder 168 only can provide simultaneous PCM data for two players at a time to the player wearing headphone 146. In contrast, an alternative is also shown in which a decoder 168' includes a mixer 166' that combines four data packets from a selection engine 164' at a time, to produce the output provided to headphone 146. In this alternative, the player is provided up to four other voice data packets simultaneously.

Alternatively, selection engine 164 can be employed to convey four selected compressed data streams to DSP 156 in the voice communication module of an intended recipient. DSP 156 again produces a corresponding PCM signal that is supplied to the DAC in the voice communication module, producing the corresponding analog signal to drive headphone 146.

Figure 5:
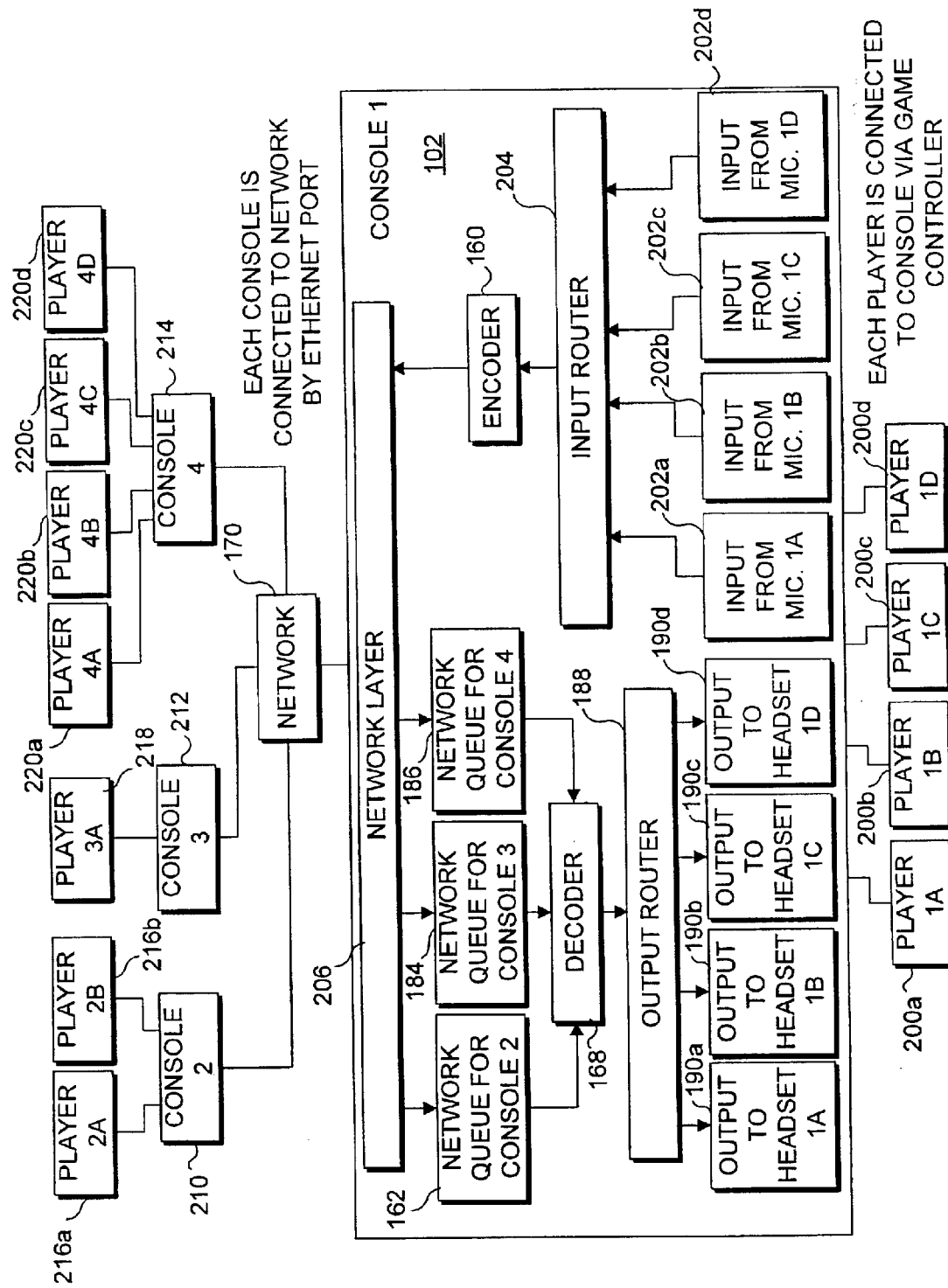
FIG. 5 is a block diagram illustrating a first multiplayer game console coupled in communication with three other multiplayer game consoles over a network.

Functional details for the "multiplayer on game console" scenario are illustrated in FIG. 5 where game console 102 is connected to network 170 through a network layer 206 and thus to a game console 210, having players 216a and 216b, to a game console 212 having a single player 218, and to a game console 214 having four players 220a, 220b, 220c, and 220d. Game console 102 has players 200a, 200b, 200c, and 200d connected thereto, and each player is provided with a game controller having a voice communication module. For this scenario, all of the players on each of consoles 210, 212, and 214 have voice communications that are encoded to produce single streams of compressed data packets. Network layer 206 in game console 102 conveys the data packets from each of the three other game consoles into three separate network queues, including a network queue 162 for second game console 210, a network queue 184 for third game console 212, and a network queue 186 for fourth game console 214. The output from the three network queues in game console 102 is input to decoder 168, and its output is applied to an output router 188 that determines the specific headphone that receives voice communications 190a through 190d.

An alternative embodiment employs output router 188 to bypass decoder 168 and pulls compressed data packets directly from network queues 162, 184, and 186. Output router 188 conveys the compressed data to the DSP in the voice communication module of the intended recipient, so that the headphone of that player receives voice communications 190a through 190d.

Accordingly, each of players 200a through 200d receives only the voice communications intended for that player. Similarly, each of the four players on game console 102 has a sound input from their corresponding microphones 202a, 202b, 202c, and 202d supplied to an input router 204, which selectively applies the PCM data streams to encoder 160, which has an output coupled to network layer 206. The network layer ensures that the compressed data packets conveying sound data are transported over network 170 to the appropriate one of game consoles 210, 212, and 214. The output router in each game console with multiple players determines the player(s) who will receive the voice communication from a player using game console 102.

Another embodiment bypasses input router 204 and encoder 160 by encoding the compressed data using the DSP in the voice communication module of the player who is speaking.

Prioritization/Round Robin Technique for Encoding

Figure 6:
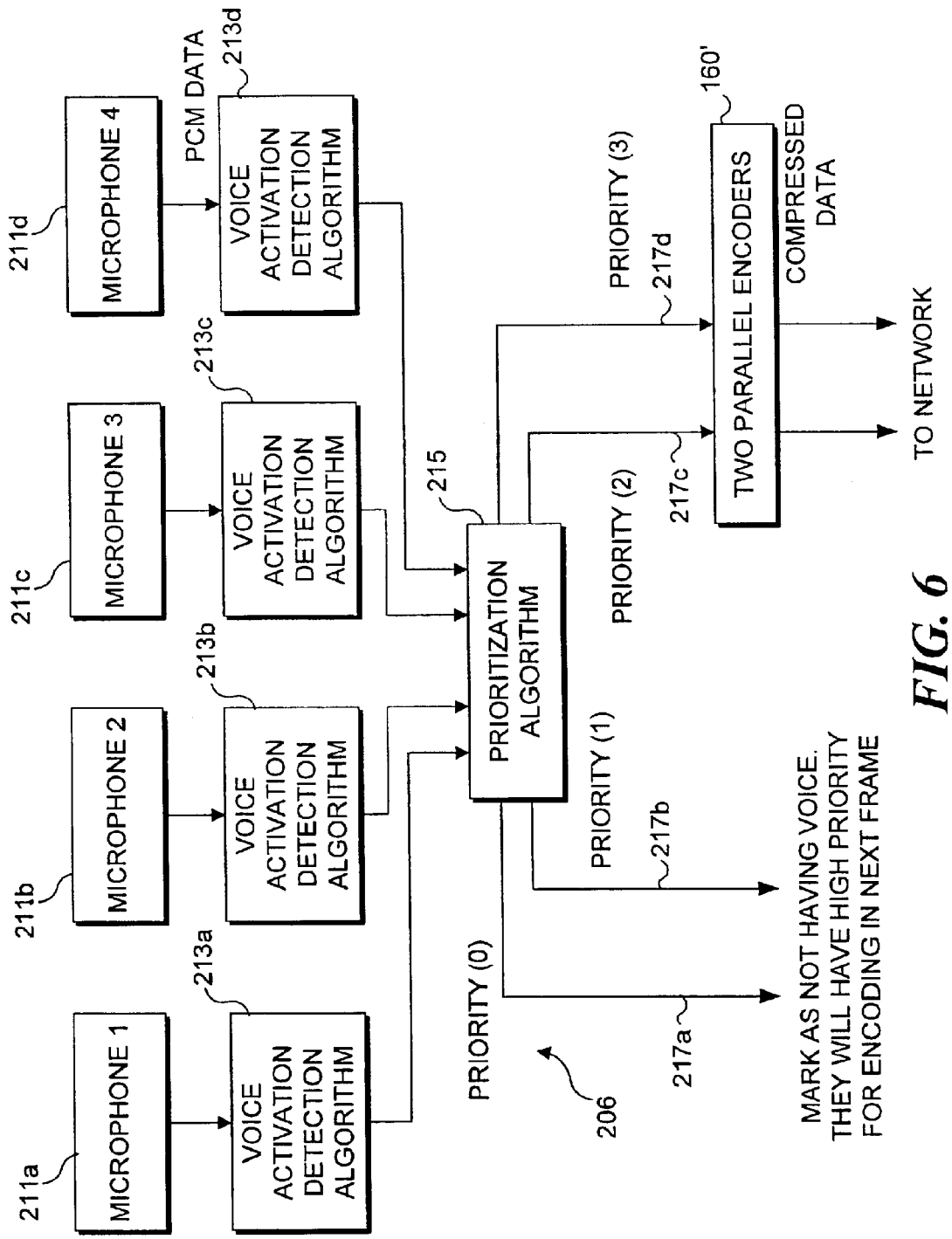
FIG. 6 is functional block diagram illustrating prioritization encoding for a plurality of players on a game console having two parallel encoders.

FIG. 6 illustrates functional aspects regarding prioritization on a game console handling voice communication by up to four players who are using the game console to play a game. During each voice interval, only two of four encoder instances are active, so that there are fewer encoders than there are players having voice communication capability, on the game console. Thus, although there are four microphone 211a, 211b, 211c, and 211d, the digital PCM data from the ADCs in the voice communication modules respectively connected to the microphones are not all encoded at the same time. Each stream of PCM data is applied to a voice activation detection algorithm, as indicated in blocks 213a, 213b, 213c, and 213d. This algorithm determines when a player is speaking into the microphone and producing PCM data that should be encoded for transmission to one or more other players in a game. In the worse case scenario, all four players might be speaking at the same time so that the voice activation detection algorithm would indicate that PCM data from all four microphones connected to the game console need to be encoded. However, since only two voice streams can be encoded at one time in this preferred embodiment, a prioritizing algorithm in a block 215 determines or selects the streams of PCM data that are input to the two parallel encoders 160'. These encoders produce compressed data in packetized frames that are conveyed over the network (assuming that the game console is connected to one or more other game consoles over a link or network). In the example shown in FIG. 6, the prioritizing algorithm has selected two streams of PCM data, including PCM data 217c and 217d, as having the highest priority for encoding in the current frame for output over the network. In contrast, PCM data in streams 217a and 217b are marked as not having a voice input, but will have the highest priority for encoding in the next frame of compressed data if they then include voice data.

Figure 12:
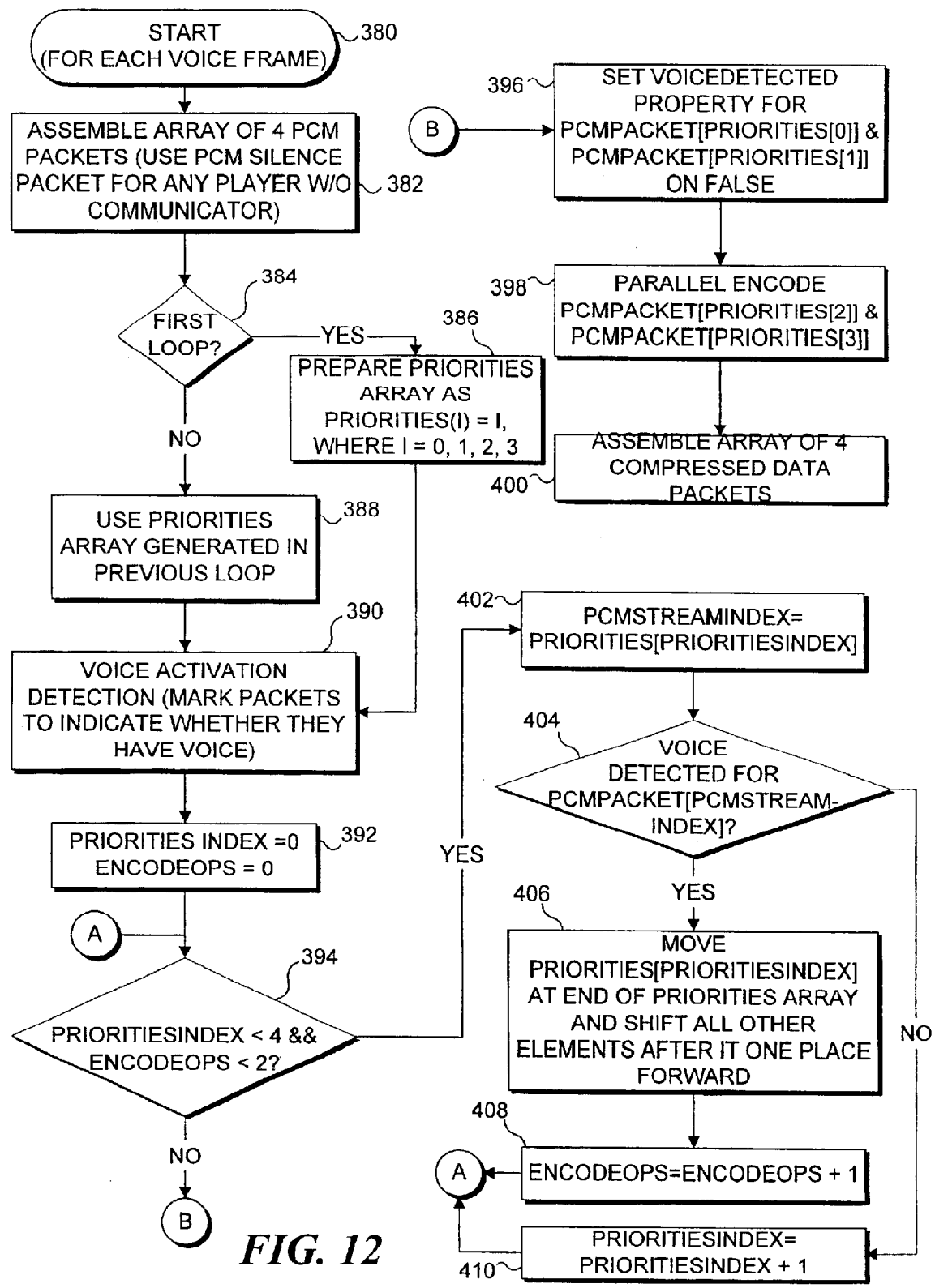
FIG. 12 is a flow chart illustrating the steps carried out for round robin encoding of sound packets.

A round-robin encoding method is used to enable two parallel encoders to encode voice communications from four players, so that fewer encoders are required on the game console than the total number of players that may be speaking during any given voice data frame. FIG. 12 provides details concerning the logical steps that are implemented to enable round-robin encoding of a voice frame, beginning with a start block 380. In a step 382, an array of the four PCM packets (one for each player) is assembled. In the case where a player does not have a voice communicator, a PCM silence packet is inserted into the array. A decision step 384 determines if the logic is carrying out a first loop for the current voice frame. If so, a step 386 provides for preparing priorities in an array using the variable priority (i) where i can have the values 0, 1, 2, or 3. Thereafter, the logic proceeds with a step 390.

If the logic is not making a first loop for the current voice frame, it proceeds to a step 388, wherein the logic uses the priorities array that was generated in a previous loop for the current voice frame. Thereafter, the logic also proceeds to step 390. In step 390, the detection of voice activation is carried out so that PCM packets are marked to indicate whether they have voice content. The algorithm detects whether the current sound level is substantially greater than an average (background) level, which indicates that a player with a microphone is probably currently speaking into it. Alternatively, the PCM packets can be analyzed to detect voice characteristics, which differ substantially from background noise characteristics. A step 392 then initializes the variable priorities index as being equal to zero and a variable encodeops as being equal to zero.

A decision step 394 determines if the priorities index variable is less than four and whether the encodeops variable is less than two. Since decision step 394 is initially reached immediately after step 392 in which these two variables have been initialized to zero, both these criteria are met, leading to a step 402. In step 402, a variable PCM stream index is set equal to the variable priorities with a value i equal to the priorities index variable. In the initial pass for a voice frame, the PCM stream index variable is set equal to priorities [0].

A decision step 404 then determines if voice has been detected for PCM packet with an index equal to the PCM stream index. Again, with the initial pass through this logic during a voice frame, the decision step determines if a voice was detected for PCM packet [PCM stream index]. If so, a step 406 moves the variable priorities [priorities index], which is at the end of the priorities array and shifts all other elements after it one place forward. A step 408 then sets the variable encodeops equal to its previous value plus one, thereby incrementing the variable. If voice was not detected in decision step 404, a step 410 sets priorities index equal to priorities index plus one, thereby incrementing that variable. Following either step 408 or step 410, the logic proceeds with decision step 394.

Once the priorities index variable is equal to four or the encodeops variable is equal to two, the logic proceeds to a step 396. In this step, the logic sets the voice detected property for PCM packets [priorities [0]] and PCM packets [priorities [1]] on false. A step 398 then provides for parallel encoding of PCM packet [priorities [2]] and PCM packet [priorities [3]]. Finally, in a step 400, the logic assembles an array of four compressed data packets for transmission over the network for the current voice frame. Based upon this logic, it will be apparent that if all four players are actually speaking, PCM packets will be encoded to form the compressed packets using this round-robin algorithm so that all of the players on a voice console can communicate with other players in the game.

It may be helpful to work through an example in which it is assumed that players one, two, three, and four are all talking at the same time. A history of the last two voices or players that have been encoded is maintained. The logic starts looking at the current microphone packet for player one. If a voice is detected by the algorithm, it is encoded. Next, the same determination is made for player two, i.e., if a voice is present at player two's microphone, it is encoded in the current voice frame. The initial history starts out with the players ordered [1, 2, 3, 4], but at this point, it is updated so that the order is players [3, 4, 1, 2]. The logic loops back, after a predefined microphone encoding interval, to process the audio data for the two players that were not processed the last time. Currently the history list is [3, 4, 1, 2], so a check is made to determine if player three currently has voice input on his microphone, and if so, it is encoded. However, if player three is no longer talking at this time, the logic instead proceeds to player four, who it is assumed is talking. Accordingly, the digital PCM voice packet for player four is encoded and the history is updated to [3, 1, 2, 4]. Next, the logic proceeds to player one, encoding that player's voice, producing a new history [3, 2, 4, 1]. The logic will then start with players three and two. Assuming that player three still is not speaking so that there is no voice at that player's microphone, the logic encodes the digital PCM packets for players two and four, yielding a history list [3, 1, 2, 4].

In one embodiment, for each PCM packet of a player that is skipped and not encoded, the previous packet for that player is attenuated and replayed for the voice frame. In the worst possible state, when all players are talking and there are actually four different players on the game console who are in different teams, every other PCM packet of each player is skipped. Although this approach may have a slight negative impact on the quality of the voice of each player, it is the worst case scenario, and this scenario typically occurs infrequently during game play.

It should be noted that PCM packets of a player that are skipped and thus must be filled in by repeating the previous packet are not transmitted over the network. Instead, the repeated PCM packet is handled by the receiving game console used by the intended recipient of the packet. Accordingly, at most, two packets are sent from a game console during any one voice frame, instead of the maximum of four. The queue buffers the previous packet and provides it to replace a skipped packet. Alternatively, a skipped packet will not be put into the queue by the receiving game console, but instead, a notification indicating that the packet was skipped by the game console that made the transmission will be inserted into the network queue of the receiving game console, for that channel.

The round-robin encoding technique only operates on two frames of speech at a time and repeats the other frames of those streams that are not currently encoded. As noted above, this can result in degradation of sound when all four players on a game console are speaking, but the technique avoids using additional CPU resources to separately encode the voices of all four players, which might have a negative impact on game play.

In an alternative embodiment, one encoder per player is allocated for encoding speech. However, this embodiment is less desirable, because it requires twice the computational resources as the embodiment discussed above.

Voice Communication Over Link/Network

Figure 10:
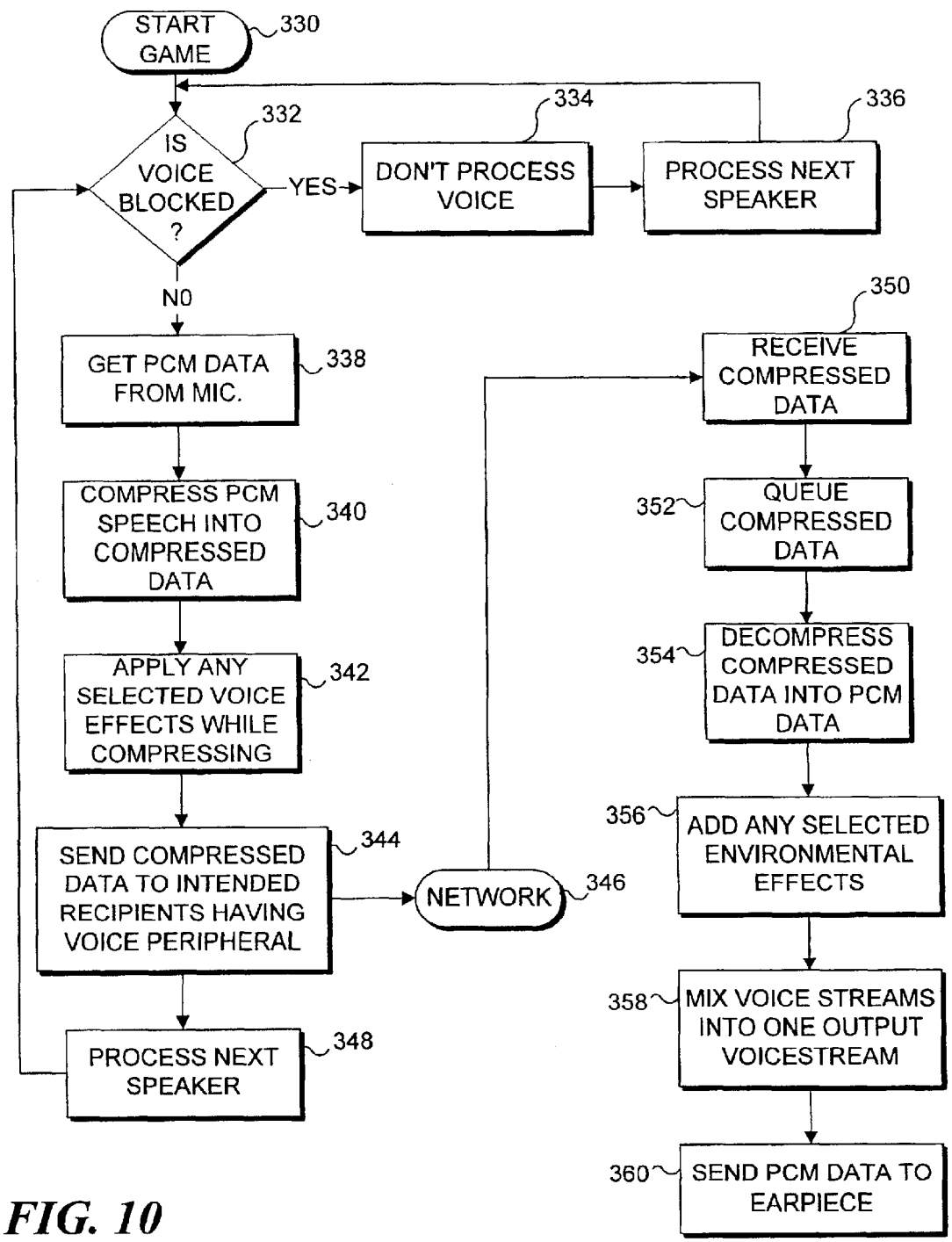
FIG. 10 is a logic diagram illustrating further details of the steps for transmitting and receiving encoded packets of sound data over a network.

FIG. 10 illustrates the general steps applied for enabling voice communications over a link or network. Initially, a game is started in a step 330. Next, a decision step 332 determines if the player is stopped from communicating by voice with other players. This state may result because of the player being banned or suspended from voice communication by the online game service due to violations of a code of conduct or other service policies. Another reason voice may be blocked is due to a determination by an authorized person such as a parent that a minor child should not be permitted to engage in voice communications with other players during a game. This option is available and can be set using options provided on the game console for specific player accounts. Once set, the data are stored on the online game service, and blockage of voice communication is enforced each time the player connects to the service. If the current player's voice communication is blocked, a step 334 determines that the game console need not process voice communications and instead, proceeds to a next speaker, in a step 336. Assuming that the next speaker is not precluded from having voice communication by a setting on the game console, the logic advances to a step 338, which gets the PCM data from the ADC in the voice communication module for that player. Next, the logic compresses the PCM speech data into compressed data in a step 340. A step 342 applies any assigned voice effects when compressing the current player's PCM speech data to alter the characteristics of the player's voice. In a step 344, the compressed data are transmitted over a network 346 to an intended receiving game console to reach the intended recipients that have a voice communication module. A step 348 provides for processing the next speaker on the game console that is transmitting compressed data, thereby returning to decision step 332.

On the game console that has received the voice communication over network 346, a step 352 provides for adding the compressed data to a network queue of such data. Next, in a step 354, the game console decompresses the compressed data pulled from the queue, producing corresponding PCM data. A step 356 provides for adding any optional environmental effects. Such effects are generally determined by options provided in a game being played on the game console. For example, an environmental effect might include adding an echo, or introducing a reverberation if the environment of the game is within a cavern, or the environmental effect might involve providing a frequency band equalization, e.g., by adding a bass boost for play of the audio data on small speakers. Next, a step 358 mixes voice streams received from a plurality of different players into one output voice stream that will be provided to an intended recipient player. The output voice stream is conveyed as PCM data to the DAC associated with the headphone of the intended recipient player in a step 360, which produces a corresponding analog signal to drive the headphone. The player thus hears the voice communication from each of the players that were decoded and mixed into the output voice steam.

Muted Voice Communication between Players

Another situation arises whenever a specific player has been muted from voice communication by another player. Once a player has thus been muted, the specific muted player will be unable to either hear or speak with the muting player. The muting player must explicitly unmute the muted player to restore voice communication.

Handling of Network Data Packets

Figure 11:
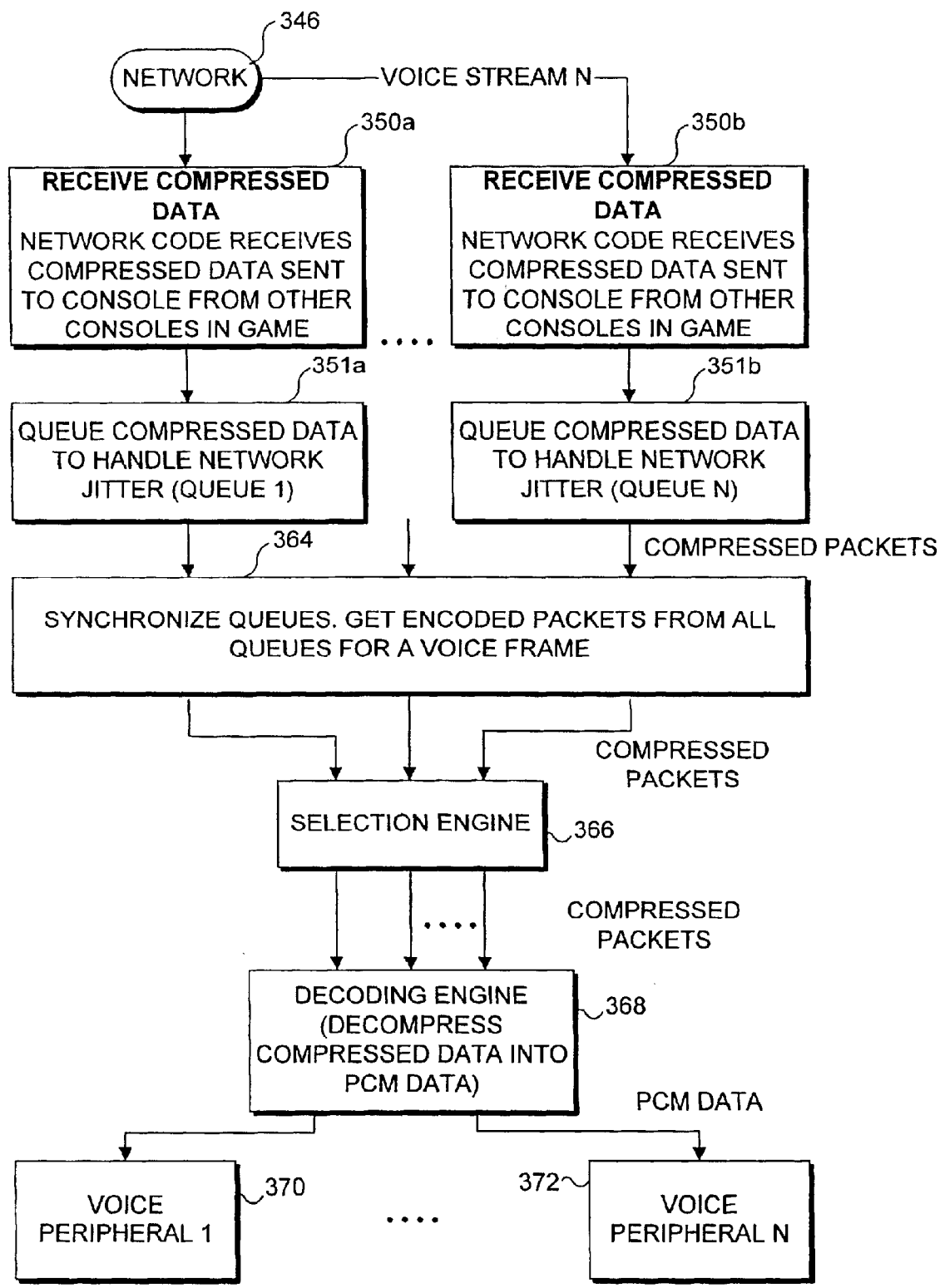
FIG. 11 is a functional block diagram showing how voice streams are received, queued, and decoded for each player on a multiplayer game console.

FIG. 11 illustrates further details in regard to the receipt of voice communication data as packets over network 346. As indicated in block 350a and 350b, compressed data are received the network from N other game consoles. Each channel of the compressed data is initially input into one of N queues 351a–351b, where a separate queue is provided for each player on a connected game console (one or more players on each game console). A block 364 then synchronizes the N queues that have been formed to receive the compressed data. In this step, the encoded and compressed packets are obtained from all of the queues for a current voice frame. A selection engine 366 then determines the compressed packets that should be assembled for input to the decoding engine in a block 368. The decoding engine decompresses and decodes the compressed data, converting the data into PCM data that are then applied to each of the connected voice peripheral communications modules 370 through 372 to enable the players respectively using those voice communication modules to hear the sound that was transmitted over the network to them.

Figure 7:
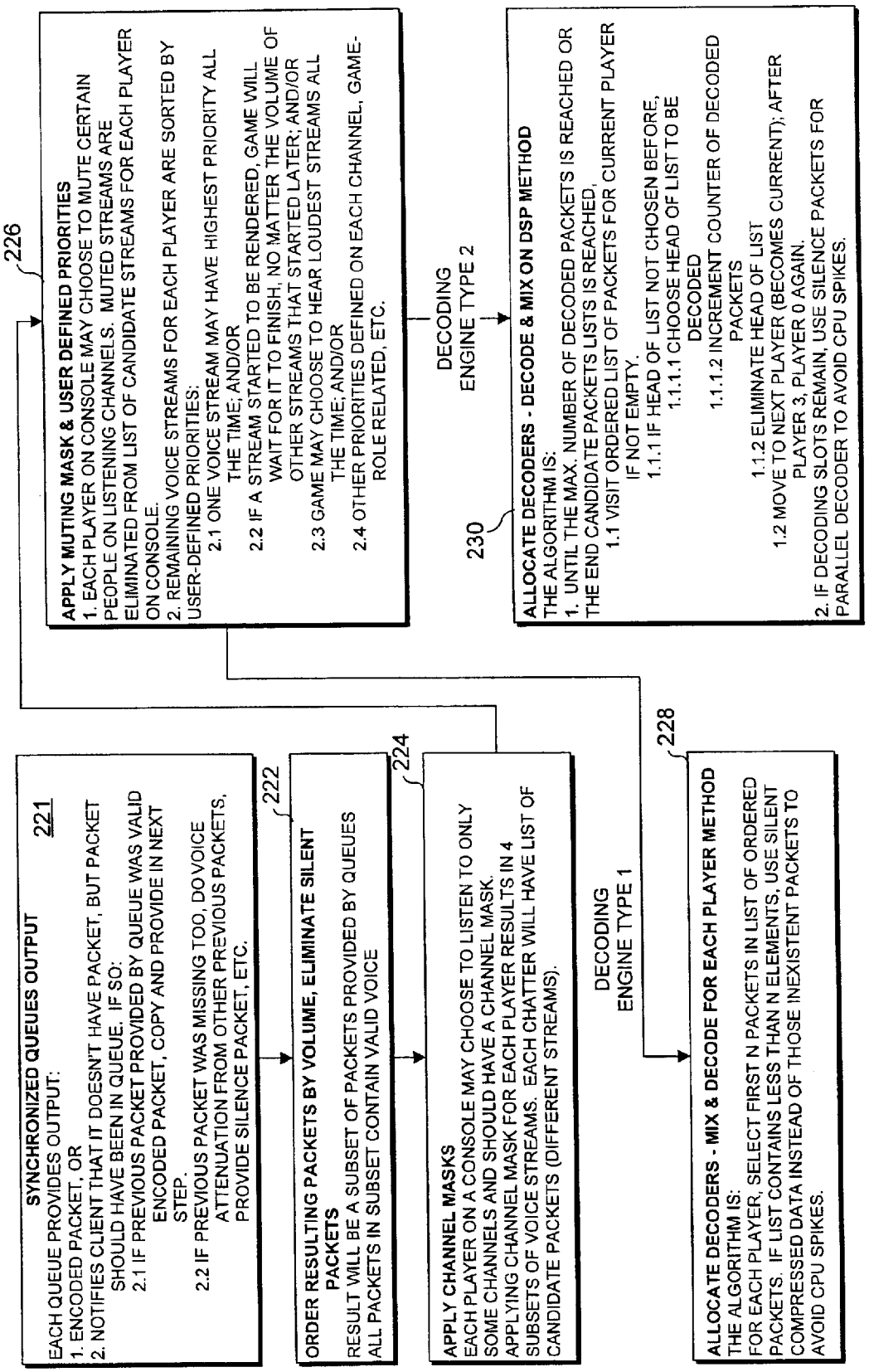
FIG. 7 is a logic diagram illustrating the steps employed by the present invention in selecting packets from a queue to decode on a multiplayer game console.

Details relating to the processing of encoded packets that are received from each queue are shown in FIG. 7. In a block 221, the CPU checks each queue to obtain an encoded compressed packet or the queue notifies the client CPU that it does not have a packet from a player, but that a packet for that player should have been in the queue. In this case, the CPU determines if the previous packet obtained for that player from the queue was in fact a valid encoded packet and if so, the CPU copies the previous packet for that player so it can be provided for further processing in the next block. However, if the previous packet for that player was also missing, the CPU does an attenuation on previous packets for that player. The purpose of this step is to minimize the perception of silence caused by a missing packet resulting from skipping packets during round-robin encoding and from dropped packets due to network conditions.

Next, in a block 222, the packets that have been obtained in block 221 are ordered, and all silent packets in the order are eliminated. The result is a subset of the packets originally provided in the queues. Due to the processing noted above, all packets in the subset will contain valid voice data.

Next, a block 224 provides for applying channel masks to the voice data. Each player is associated with a channel, and all players on a particular channel are able to communicate by voice with each other. For example, one channel may be used for voice communication between a player who is designated as a team leader and team members, enabling that player to communicate with all members of the team. In addition, the team leader may also be able to select another channel for verbal communication with another player designated as a commander, who is able to communicate with a plurality of team leaders, or yet another channel to enable the team leader to communicate only with the other team leaders. In this implementation, each player who is talking is given a 16-bit word that defines the "talker channel" for the player. The game determines what the individual bits of the word for the talker channel mean, e.g., indicating that the talker channel is for a team, a team leader, a commander, etc. In addition, each player can be assigned a "listener channel" on which they can receive speech. When a voice communication comes in over the network, the talker channel is logically "ANDed" with the listener channel for a given player, and if the result is not zero, then that player is able to hear the voice communication. In this manner, the game being played (or each player, within the constraints of the game) is able to select arbitrary permutations that determine the players that are coupled in voice communication with other players.

Referring again to FIG. 7, block 224 enables each player to choose to listen to only some channels and to employ a channel mask. A channel mask is applied for each player on the game console resulting in up to four subsets of voice streams—one subset for each player listening, based upon the player's individual listener mask. Each person who is listening will have a list of candidate packets included in different voice streams.

In a block 226, the muting mask and user defined priorities are applied. While a preferred embodiment enables a player to selectively preclude further voice communications with a selected player, it is also contemplated that a player might selectively only mute voice communications with a specific player during a current game session. In this alternative embodiment, each player on a game console might choose to mute certain people on listening channels. Voice streams from players who have been muted by that player will then be eliminated from the list of candidate voice streams for that player on the game console. Any remaining voice streams for each player are sorted by user-defined priorities. In this step, one voice stream may have the highest priority all the time. For example, the game (or a player—if the game permits this option) may selectively set a channel coupling team member in voice communication with a team leader so that that channel has the highest priority for each of the team members. Loudness of the incoming voice stream can also be a basis for determining the priority of a channel for a given player, so that the player hears the loudest voice streams all of the time. Alternatively, or in addition, if a voice stream has started to render, the game will wait for it to finish regardless of the loudness of the other voice streams that started later so that a sentence is not cut off in "mid-stream," before it is finished. As a further alternative or in addition, other priorities can be defined for each voice channel. For example, a game-specific role related priority can be applied.

Following block 226, decoding is applied to the voice streams resulting from applying the muting masks and user/game defined priorities using either a decoding engine type one as indicated in a block 228 or a decoding engine type two as indicated in a block 230. In block 228, decoding engine type one allocates decoders, mixing and decoding for each player method. In this algorithm, for each player, the first N packets in a list of ordered packets are selected. If the list contains less than N elements, silent compressed data packets used instead of the inexistent packets to avoid producing spikes in the CPU processing of the voice packets.

In block 230, when applying decoding using engine type two, decoders are allocated for decoding and mixing in a DSP method. In accordance with this algorithm, until the maximum number of decoded packets is reached, or the end of the candidate packet is reach, or the end of the candidate packet list is reached, the current player is obtained from the ordered list of packets, if the list is not empty. If the head of the list of ordered packets has not been chosen before, the head of the list is then chosen to be decoded and the counter is incremented for the decoded packets. Thereafter, the head of the list is eliminated from the ordered list. Next, the algorithm moves to the next player, who then becomes the current player. For example, after player four, player one would then again become the current player. If any decoding slots remain for decoding additional voice packets, silence packets are applied to the parallel decoder to avoid spikes in CPU processing of the voice packets.

Decoding Engines Types One and Two

Figure 8:
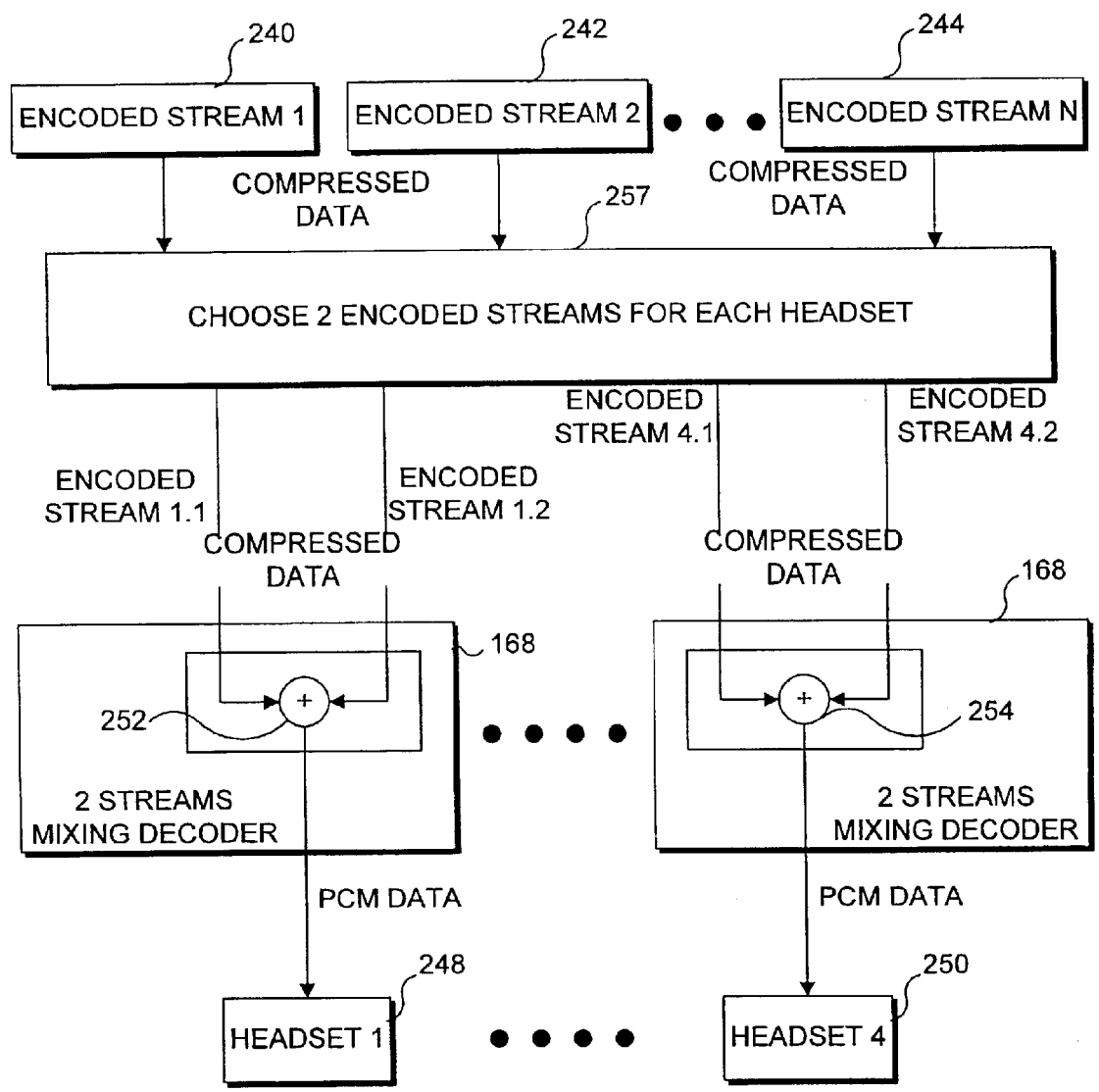
FIG. 8 is a functional block diagram illustrating a Type 1 decoding engine used in the multiplayer game console.

In FIG. 8, details relating to the functional aspects of decoding engine type one are illustrated. As shown therein, encoded streams from one through N designated by reference numerals 240, 242, and 244 provide compressed data to a selection engine 257 that chooses two encoded streams for decoding for each player headphone. In this case, an encoded stream 1.1 and an encoded stream 1.2 are selected for input to decoder 168 where the streams are mixed by a mixer 252 prior to decoding. The output of the decoder is PCM data that are supplied to the DAC within the voice communication module for a headset 248. Similarly, for each of the other player headphones, another decoder 168 receives encoded voice streams as compressed data, which are then mixed and decoded. As shown, the decoder for a fourth player includes a mixer 254 that mixes encoded voice streams 4.1 and 4.2 so that the decoder produces PCM data that are supplied to the DAC that provides the analog signal to drive a headphone 250 for the fourth player on the voice console. Of course there are instances where less than four players will be using a game console, in which case, fewer than four decoders are required to be active.

An alternative embodiment to both decoding engine type 1 and decoding engine type 2 conveys the prioritized voice streams (at block 226) directly to the DSP in the voice communication module of the intended recipient.

Figure 9A:
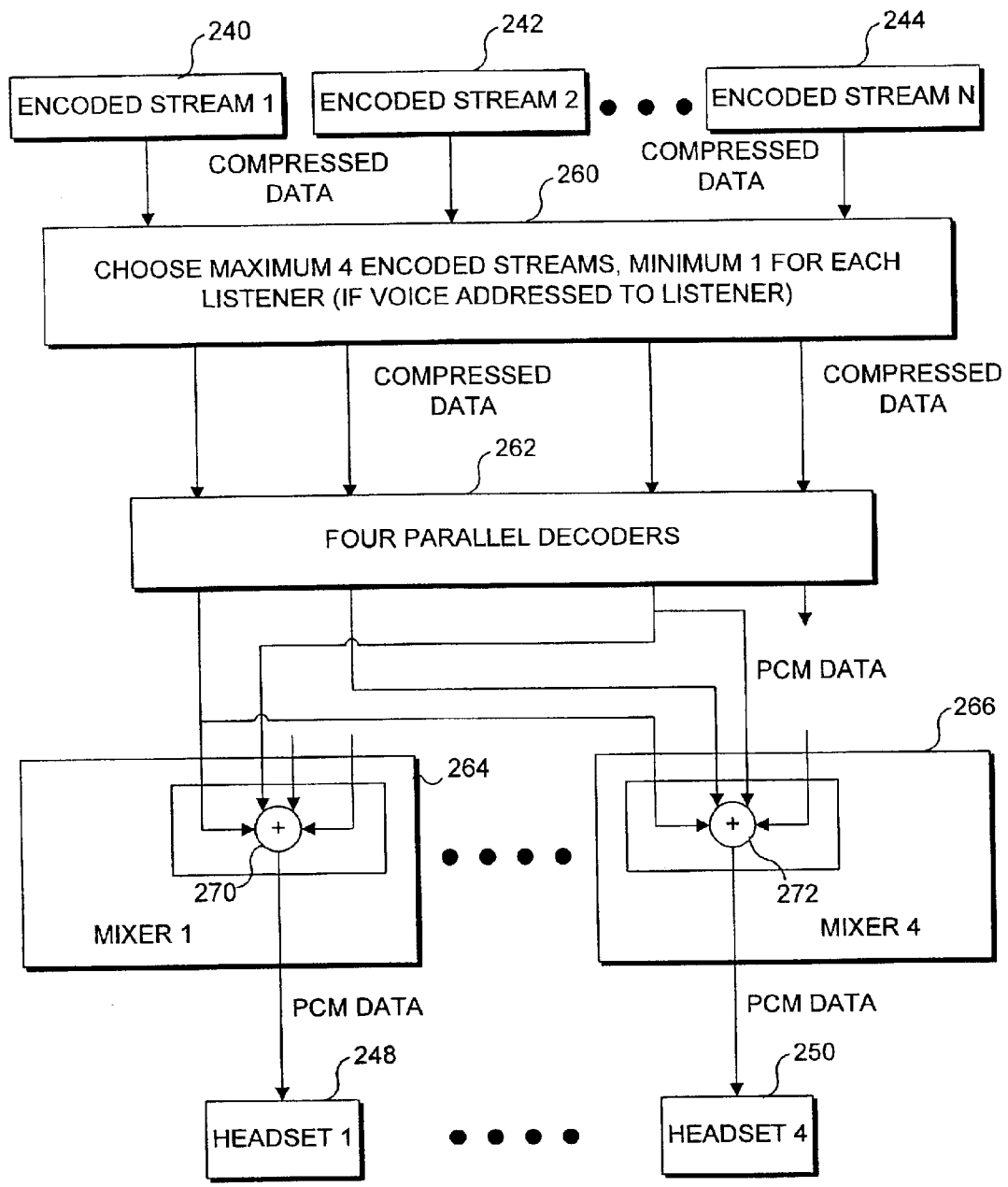
FIG. 9A is a functional block diagram illustrating a Type 2 decoding engine used in the multiplayer game console.

Functional aspects of the type two decoding engine are illustrated in FIG. 9A. Again, encoded streams one through N represented by reference numbers 240, 242, and 244 are input to a selection engine 260, which chooses the maximum four encoder streams, a minimum of one for each player who is listening and has a voice stream addressed to that player. In this case, four parallel decoders 262 receive the four selected encoded voice streams of compressed data. The decoders then decode the compressed data and supply the resulting PCM data to a mixer for each player to whom any voice stream was intended. In this case, the first player receives two voice streams from other players that are mixed by a mixer 270 in a mixer identified by reference number 264. Although not shown, each of the other players receiving voice communications from other players in the game would also be provided with a separate mixing bin to which the output of the four parallel decoders is applied for mixing. For example, the fourth player receives three voice streams that are mixed by a mixer 272 in a mixer identified by reference numeral 266. The resulting PCM data are then applied to headset 250 for the fourth player. Thus, each player can receive from one to four voice streams that are mixed by the four-in-one mixing bin assigned to that player.

Another embodiment (at block 260) bypasses decoder 262 and mixers 264 and 266 and conveys the compressed data to the DSPs of the voice communication modules coupled to headphones 248 and 250, respectively.

Figure 9B:
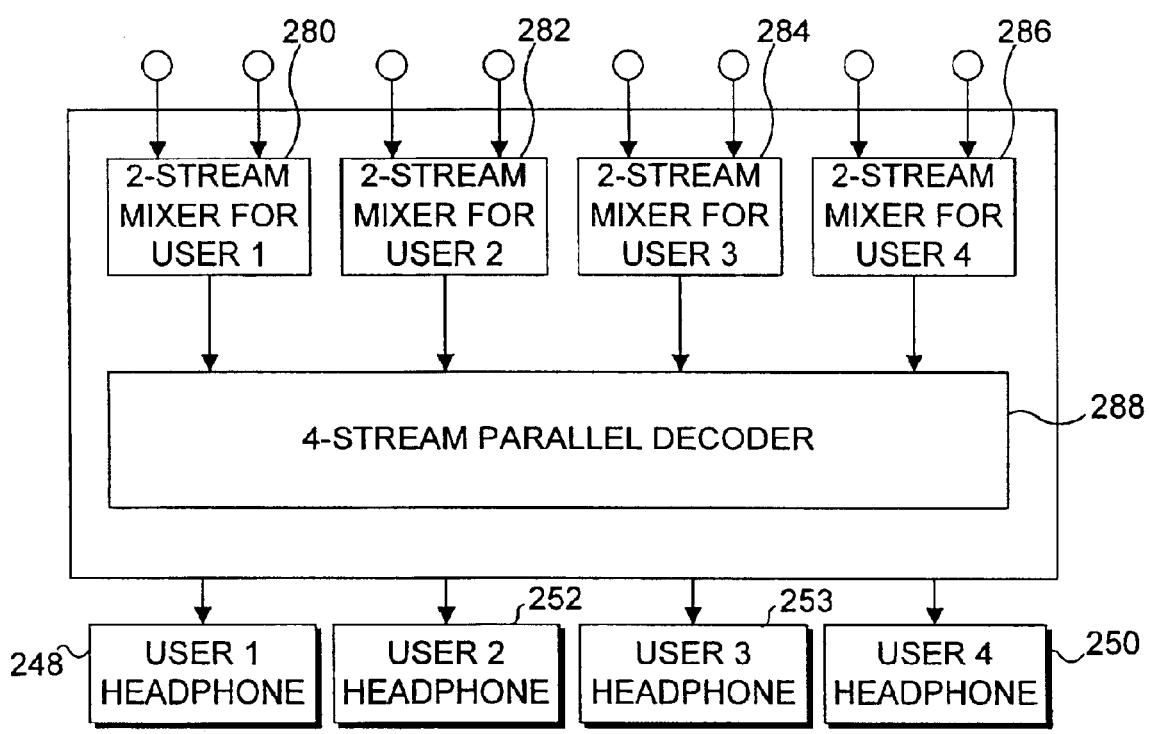
FIG. 9B is a block diagram illustrating details of the mixers and 4-stream parallel decoder of FIG. 9A.

An alternative approach for use in the type two decoding engine is illustrated in FIG. 9B. In this embodiment, the relative disposition of the decoder and the mixers are reversed from that shown in FIG. 9A. Specifically, each player is provided with a two-stream mixer that is coupled to receive and mix the compressed data incoming over the network. A two-stream mixer 280 is provided for player one, a two-stream mixer 282 for player two, a two-stream mixer 284 for player three, and a two-stream mixer 286 is provided for player four. Up to two voice streams of compressed data are thus input to each of these mixers per player and are mixed, providing a single mixed stream from each mixer for input to a four-stream parallel decoder 288. This decoder then decodes the compressed data producing PCM data that is supplied to each player headphone 248, 252, 253, and 250 who is an intended recipient of a voice communication from another player.

Yet another embodiment provides that the compressed data conveyed to two-steam mixers 280, 282, 284, and 286 is decoded by the DSPs of the voice communication modules coupled respectively to headphones 248, 252, 253, and 250.

Controlling Voice Communication with Other Players

Figure 13:
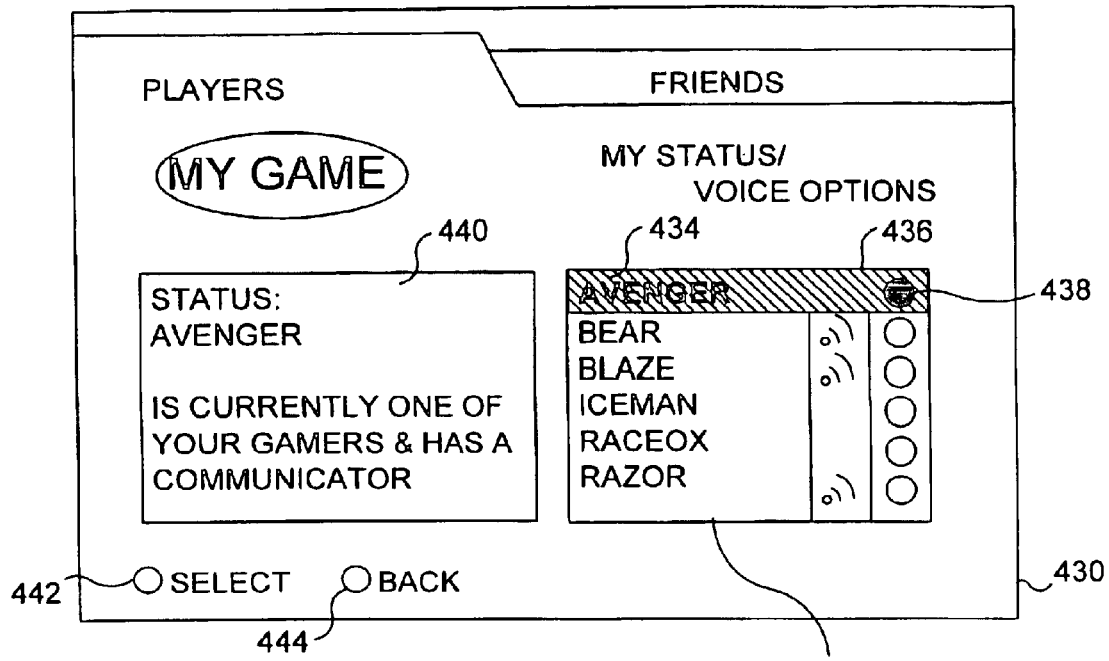
FIG. 13 is an exemplary user interface for selecting voice options in a game that employs voice communication between players.
Figure 13A:
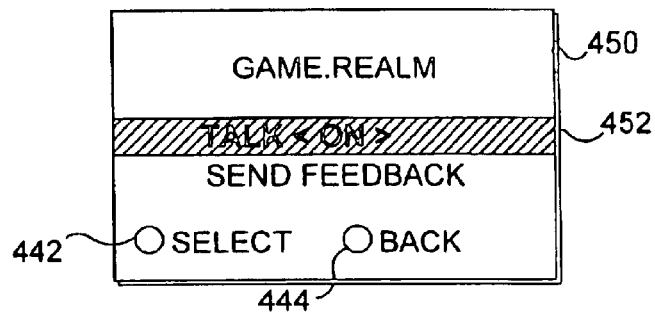
FIGS. 13A and 13B illustrate two different options that are selectable by a player to control or preclude voice communication with another player in a multiplayer game, in accord with the present invention.
Figure 13B:
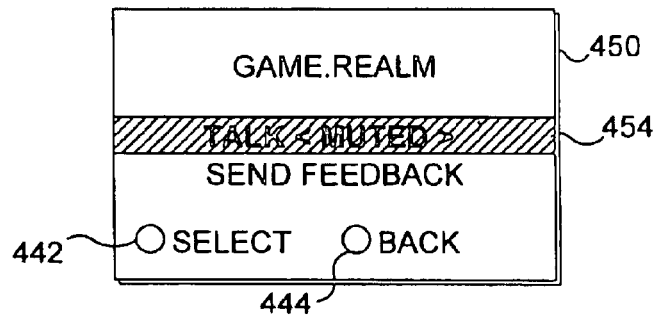

As noted above, a player has the option of precluding further voice communications with a specific player because of behavioral issues or for other reasons. For example, if a specific other player tends to uses excessive profanity, a player may choose not to engage in further communications with that other player. Each game will generally provide an option for a player to mute voice communications with another player for the current and future game sessions, and it is also contemplated that a player might also be enabled to mute voice communications with another player for only a current game session. FIGS. 13, 13A, and 13B illustrate exemplary dialog boxes 430 and 450 that enable this control of voice communication to be implemented in a game called "MY GAME." This fictitious game lists each of the players, as shown in a player list box 432. Player list box 432 includes six players of which the top listed player has been selected as indicated by a selection bar 434. This player, who plays the game using the alias "Avenger," has voice communications capability, as indicated by a speaker symbol 436 that is shown in one column of the dialog, in the same row as the alias. Players respectively using the aliases "Iceman" and "Raceox" do not have voice communication capability, as is evident by the lack of speaker symbol 436 in this column, in the same row as either of these aliases. A radio button 438 is provided to enable any of the players listed to be muted from voice communication with the current player who is viewing players list box 432. In this case, Avenger has been selected by the player, as indicated by radio button 438. When the player is selected, a window 440 opens that identifies the selected player and notes that this player is currently one of the participants in the game and has a voice communication module. If the player viewing player's list box 432 clicks on a select button 442, a voice communication status select 450 opens that includes an option bar 452, which can be toggled to different states. As shown in FIG. 13A, option bar 452 indicates that the selected player has been enabled to verbally communicate with the player who is selecting this option. In FIG. 13B, the option bar has been toggled to a state 454, which indicates that the player viewing the state wants to mute the selected player for the current game session. Depending upon the selection that the player makes, speaker symbol 436 will change. Instead of that shown in FIG. 13, if the player selected the option to mute the specific player has been chosen a dash box will appear around the speaker symbol shown. This type of muting expires alter the current game session ends. On the other hand if the specific player has been selectively locked out, a dash heavy-bar box will be added around speaker symbol 436. In this case, the decision to mute a player can only be turned off by the player making that decision from within a game session or using a system control for the game console. Yet another symbol (not shown) is used to indicate that voice communications for corresponding player are being played through loudspeakers (e.g., television or monitor speaker) connected to the game console of the recipient player, rather than through a headphone. This option can be selected by a player, who prefers not to wear a headset, but is less desirable, since the player will not be using a microphone to verbally communicate with other players.

In the event that a number of players provide negative feedback concerning a specific player based upon the verbal behavior of that player being deemed to be unacceptable, such as excessive use of profanity, or use of sexually explicit language, the online game service can automatically determine that the number of complaints received has exceeded a threshold, causing the specific player to be banned from further voice communication. The ban might initially be for a limited period of time such as a week, and then subsequently, if further complaints are received beyond the threshold, the specific player might be banned permanently from voice communication. A specific player that has been banned in this manner will be informed first of the temporary suspension of voice communication capability, and then of the permanent suspension, if the behavior of the player causes that result. Each time a player logs into the online game service on a game console, permission flags are downloaded to the game console as part of the sign in process. These flags include information about various aspects of the system. One of the flags determines whether a specific player has permission to engage in voice chat. Accordingly, in the event that a specific player violates the terms of service or code of conduct, the bit controlling the ability of the player to communicate by voice can be changed to preclude such voice communications.

Once a player has elected to preclude voice communications with a specific player, the identification of the specific player is preferably transmitted to an online game service and stored there in relation to the identity of the player making that election, so that in future sessions of any games, the player who has made such a decision will not receive any voice communication from the specific other player and will not transmit any voice communication to the specific other player. This decision will not be apparent to the specific other player, since the dialog box showing the status of players in a game will simply display an indication on the specific other player's view that the player making that decision lacks voice communication capability, and in the dialog displayed to the player making the decision, the muted status of the specific other player will be indicated. Thus, even though the specific player changes the alias used or signs on with a different game console, the prohibition against voice communication for the specific player made by a player will continue in force.

When participating in a game over the Internet or other network, a player may optionally, depending upon the game being played, choose to play only with players who agree to a specific language in which voice communications are to be conducted. Also, the player can optionally determine to play a game only with those players having voice communication capability. Similarly, players without voice communication capability may selectively play in games only with those other players who also do not have voice communication capability. These decisions typically will apply only to a current game session.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

What is claimed is:

1. For use with an electronic game played on at least one multiplayer game console having a capability to provide verbal communication between players of games being played on said at least one multiplayer game console, a method for preventing verbal communication by a specific player, comprising the steps of:
   (a) maintaining data for each player participating in a game;
   (b) including an indicator in the data, said indicator referencing the specific player who is precluded from verbally communicating during at least one of:
      (i) a current game session played with another player who has chosen not to verbally communicate with the specific player;
      (ii) all games played with another player who has chosen not to verbally communicate with the specific player;
      (iii) all games played by the specific player over a network and using a specific online game service; and
      (iv) all games played by the specific player using any multiplayer game console; and
   (c) responding to the indicator in the data by automatically preventing verbal communication with the specific player in accord with said at least one of subparagraphs (i)–(iv) of step (b).

2. The method of claim 1, wherein the data include an association between the other player who has chosen not to verbally communicate with the specific player and the indicator referencing the specific player, so that the specific player will be prevented from verbally communicating with the other player in any game in which both the other player and the specific player are participating.

3. The method of claim 2, wherein the data are maintained for each player in a game that is played over the network that connects the players through the specific online game service, said data being accessed by the multiplayer game console.

4. The method of claim 1, wherein the data are created by a game being played on the multiplayer game console and include an association between the other player who has chosen not to verbally communicate and the indicator referencing the specific player, so that the specific player will be prevented from verbally communicating with the other player during the game in which both the other player and the specific player are participating on the multiplayer game console.

5. The method of claim 1, further comprising the step of enabling a parent to select an option on the game console that determines whether a minor child of the parent is able to participate in verbal communication while playing games, wherein the indicator included in the data references the minor child as the specific player and thereby indicates that the parent of the minor child has chosen to block verbal communication over the network by the minor child in games played by the minor child.

6. The method of claim 1, wherein the data that include the indicator are accessed at the online game service used for playing games over the network.

7. The method of claim 1, further comprising the step of automatically creating the indicator in the data in regard to the specific player, as a function of a number of complaints made by other players about a behavior of the specific player.

8. The method of claim 7, wherein the data further include an indication of a time interval during which the specific player will be prevented from verbally communicating during games played over the network through the specific online game service, said data being accessed by the multiplayer game console when said specific player becomes a participant in a game being played through the online game service.

9. The method of claim 1, wherein the indicator in the data refers to the specific player independently of any alias used by the specific player and without regard to a specific game console used by the specific player to play a game over the network.

10. The method of claim 1, wherein during a game in which both the specific player and the other player who has chosen not to verbally communicate with the specific player are participating, further comprising the step of displaying to the specific player an indication that the other player is unable to verbally communicate.

11. The method of claim 1, wherein during a game in which both the specific player and the other player who has chosen not to verbally communicate with the specific player are participating, further comprising the step of displaying to the other player an indication that the specific player has been muted.

12. The method of claim 1, wherein if the specific player has been precluded from verbally communicating while participating in all games played over the network through the specific online game service, further comprising the step of indicating to all other players in a game in which the specific player is participating, that the specific player has been banned from verbally communicating over the network.

13. A memory medium having a plurality of machine executable instructions for carrying out the steps of claim 1.

14. A system for preventing verbal communication by a specific player during play of an electronic game, comprising:
   (a) a multiplayer game console having a processor, a network interface adapted for communicating over a network with at least one other multiplayer game console, and a memory in which are stored machine instructions for causing the processor to carry out a plurality of functions, said functions including executing an instance of a game; and
   (b) verbal communication input and output devices for each player who will be verbally communicating during the game, each verbal communication input and output device being adapted to connect to the multiplayer game console and including:
      (i) a sound sensor that produces an input signal indicative of sound incident on the sound sensor; and
      (ii) a sound transducer that produces an audible sound in response to an output signal that is applied to the sound transducer;
   (c) said machine instructions causing the processor to preclude a specific player from verbally communicating during at least one of:
      (i) a current game session played with another player who has chosen not to verbally communicate with the specific player;
      (ii) all games played with another player who has chosen not to verbally communicate with the specific player;
      (iii) all games played by the specific player over a network and using a specific online game service; and
      (iv) all games played by the specific player using any multiplayer game console.

15. The system of claim 14, wherein the machine instructions cause the processor to identify the specific player who is precluded from verbally communicating based upon an indicator included in data that reference the specific player.

16. The system of claim 15, wherein the data include an association between the other player who has chosen not to verbally communicate with the specific player and the indicator referencing the specific player, so that the processor of the multiplayer game console on which the other player is playing the game prevents the specific player from verbally communicating with the other player.

17. The system of claim 15, wherein the machine instructions that cause the processor to execute the instance of the game also cause the processor to maintain a record in the data for each player of the game, said record of the specific player including the indicator.

18. The system of claim 15, wherein the machine instructions cause the processor to access the data at the specific online game service for each player participating in the game that is being played over the network.

19. The system of claim 15, wherein the machine instructions cause the processor to enable an authorized party to select an option that determines whether a minor child is able to participate in verbal communication while playing games, said indicator included in the data referencing the minor child as the specific player to indicate that the authorized party has chosen to block verbal communication by the minor child over the network in games played by the minor child.

20. The system of claim 19, wherein the data that include the indicator are accessed at the online game service used for playing a game over the network.

21. The system of claim 20, wherein the data further include an indication of a time interval during which the processor prevents the specific player from verbally communicating while playing games over the network through the specific online game service, said data being accessed by the processor of the multiplayer game console when said specific player becomes a participant in a game played over the network through the online game service.

22. The system of claim 15, wherein the indicator in the data references the specific player independently of any alias used by the specific player and without regard to the multiplayer game console that is used by the specific player to play the game over the network.

23. The system of claim 15, wherein during a game in which both the specific player and the other player who has chosen not to verbally communicate with the specific player are participating, said machine instructions cause the processor of the multiplayer game console used by the specific player to indicate to the specific player that the other player is unable to verbally communicate.

24. The system of claim 15, wherein during a game in which both the specific player and the other player who has chosen not to verbally communicate with the specific player are participating, said machine instructions cause the processor of the multiplayer game console used by the other player to indicate to the other player that the specific player has been muted.

25. A method for controlling verbal communication between players who play electronic games on at least one multiplayer game console that is generally capable of supporting verbal communications between players, comprising the steps of:

(a) automatically identifying a specific player who is precluded from verbally communicating with at least one other player participating in an electronic game by accessing data maintained by an online game service that indicate the specific player, the data being accessed over a network; and (b) in response to the identification of the specific player, preventing the specific player from verbally communicating with said at least one other player during play of the electronic game on said at least one multiplayer game console.

26. The method of claim 25, wherein the network is used for connecting a plurality of multiplayer game consoles in communication to play the electronic game.

27. The method of claim 25, further comprising the step of enabling a player to select the specific player to be precluded from verbally communicating from a list of players participating in the game with the player, the specific player who was thus selected thereafter being precluded from verbally communicating with the player during any game in which the player and the specific player are both participating.

28. The method of claim 25, further comprising the step of enabling a player to select the specific player to be precluded from verbally communicating from a list of players participating in the game with the player, the specific player who was thus selected thereafter being precluded from verbally communicating with the player during a current electronic game session.

29. The method of claim 25, further comprising the step of automatically identifying the specific player as a function of a number of complaints about a behavior of the specific player by other players.

30. The method of claim 25, further comprising the step of enabling an authorized party to select an option on said at least one multiplayer game console that identifies a minor child as the specific party, to prevent the minor child from verbally communicating with any other players during any electronic game played by the minor child over a network.

31. The method of claim 25, further comprising the steps of saving the identification of the specific player in data that are accessible at an online game service to said at least one multiplayer game console, over a network.

32. The method of claim 31, further comprising the step of including a time interval during which the specific party is precluded from verbally communicating while playing any game at the online game service over the network.

33. The method of claim 25, further comprising the step of enabling user-defined priorities to determine if verbal communications with another player are heard by a player.

34. The method of claim 33, wherein said user-defined priorities include at least one of:

(a) a priority based upon specific game playing roles of players in a game;

(b) a priority ensuring completion of a verbal communication from another player by avoiding interruption of said verbal communication with another verbal communication;

(c) a priority determined by a relative loudness of a verbal communication from another player; and (d) a priority determined by a game being played.

* * * * *

UNITED STATES PATENT AND TRADEMARK OFFICE
CERTIFICATE OF CORRECTION

PATENT NO. : 6,905,414 B2
APPLICATION NO. : 10/150781
DATED : June 14, 2005
INVENTOR(S) : Damon V. Daniel et al.

Page 1 of 1

It is certified that error appears in the above-identified patent and that said Letters Patent is hereby corrected as shown below:

On the Title Page, item [30] in the Related U.S. Application Data section, insert:
-- Nonprovisional Application No. 10/147,578, filed May 16, 2002. --

Column 1, line 5, insert:
-- This application is a continuation-in-part of and claims priority to U.S. Patent Application Serial No. 10/147,578, filed May 16, 2002. --

Signed and Sealed this
Thirty-first Day of January, 2012

David J. Kappos
*Director of the United States Patent and Trademark Office*